United States Patent
Sampath et al.

(10) Patent No.: US 12,355,715 B2
(45) Date of Patent: *Jul. 8, 2025

(54) METHOD FOR ELECTRONIC IMPERSONATION DETECTION AND REMEDIATION

(71) Applicant: Armorblox, Inc., Sunnyvale, CA (US)

(72) Inventors: Dhananjay Sampath, Sunnyvale, CA (US); Arjun Sambamoorthy, Sunnyvale, CA (US); Prashanth Arun, Sunnyvale, CA (US); Robert Lyons, Sunnyvale, CA (US)

(73) Assignee: ArmorBlox LLC, San Jose, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/230,047

(22) Filed: Aug. 3, 2023

(65) Prior Publication Data

US 2024/0048514 A1 Feb. 8, 2024

Related U.S. Application Data

(63) Continuation of application No. 17/839,847, filed on Jun. 14, 2022, now Pat. No. 11,765,116.

(60) Provisional application No. 63/210,164, filed on Jun. 14, 2021.

(51) Int. Cl.
| | |
|---|---|
| *G06F 15/16* | (2006.01) |
| *G06F 40/169* | (2020.01) |
| *G06F 40/284* | (2020.01) |
| *H04L 51/212* | (2022.01) |
| *H04L 51/214* | (2022.01) |

(52) U.S. Cl.
CPC ......... *H04L 51/212* (2022.05); *G06F 40/169* (2020.01); *G06F 40/284* (2020.01); *H04L 51/214* (2022.05)

(58) Field of Classification Search
CPC ... H04L 51/212; H04L 51/214; G06F 40/284; G06F 40/169
USPC ........................................... 709/206
See application file for complete search history.

(56) References Cited

U.S. PATENT DOCUMENTS

| | | | |
|---|---|---|---|
| 2012/0030115 A1* | 2/2012 | Peace | G06Q 20/382 |
| | | | 705/64 |
| 2017/0054670 A1* | 2/2017 | Lee | H04M 1/72436 |
| 2017/0251006 A1* | 8/2017 | LaRosa | H04L 63/1441 |
| 2020/0067861 A1* | 2/2020 | Leddy | G06F 21/6245 |
| 2022/0141252 A1* | 5/2022 | Shi | H04L 63/102 |
| | | | 726/22 |

* cited by examiner

*Primary Examiner* — Imad Hussain
(74) *Attorney, Agent, or Firm* — Lee & Hayes, P.C.

(57) ABSTRACT

A method includes: accessing a corpus of emails sent from a email account prior to the initial time period; correlating sequences of words, in the corpus of emails, with language signals; aggregating the language signals into a sender model that represents combinations of language signals characteristic of language in emails sent from the email account; later, accessing a email outbound from the email account and directed to a recipient; scanning the email for the set of language signals; correlating sequences of words in the email with language signals; calculating a similarity score for the email based on the subset of language signals detected in the email and the sender model; and, in response to the similarity score falling below a threshold similarity, flagging the email as suspicious and redirecting the email away from the recipient.

17 Claims, 7 Drawing Sheets

METHOD FOR ELECTRONIC IMPERSONATION DETECTION AND REMEDIATION

CROSS-REFERENCE TO RELATED APPLICATIONS

This application is a continuation of U.S. patent application Ser. No. 17/839,847, filed on 14 Jun. 2022, which claims the benefit of U.S. Provisional Application No. 63/210,164, filed on 14 Jun. 2021, each of which is incorporated in its entirety by this reference.

TECHNICAL FIELD

This invention relates generally to the field of Internet security and more specifically to a new and useful method for electronic impersonation detection and remediation in the field of Internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
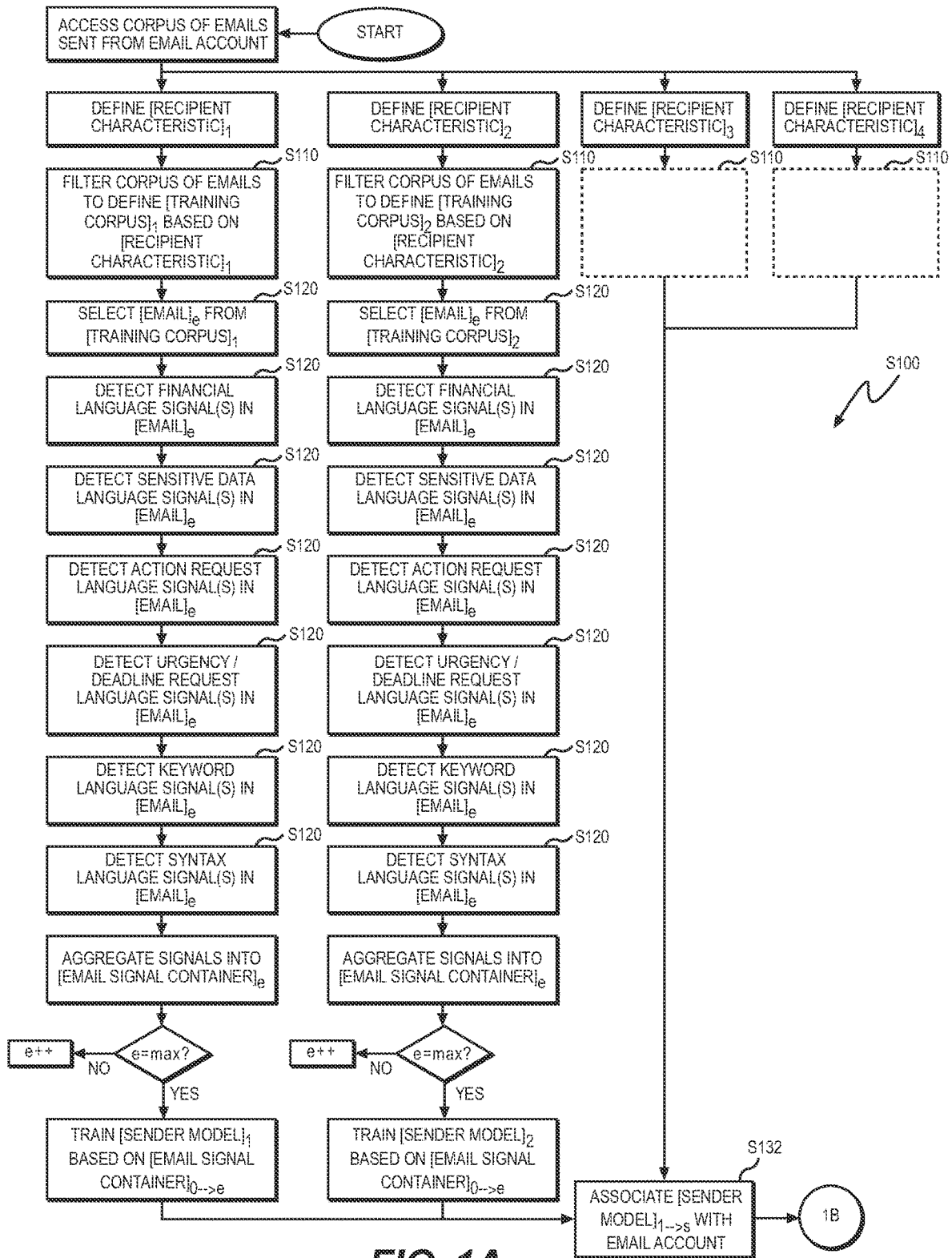
FIGS. 1A, 1B, and 1C are a flowchart representation of a first method.
Figure 1B:
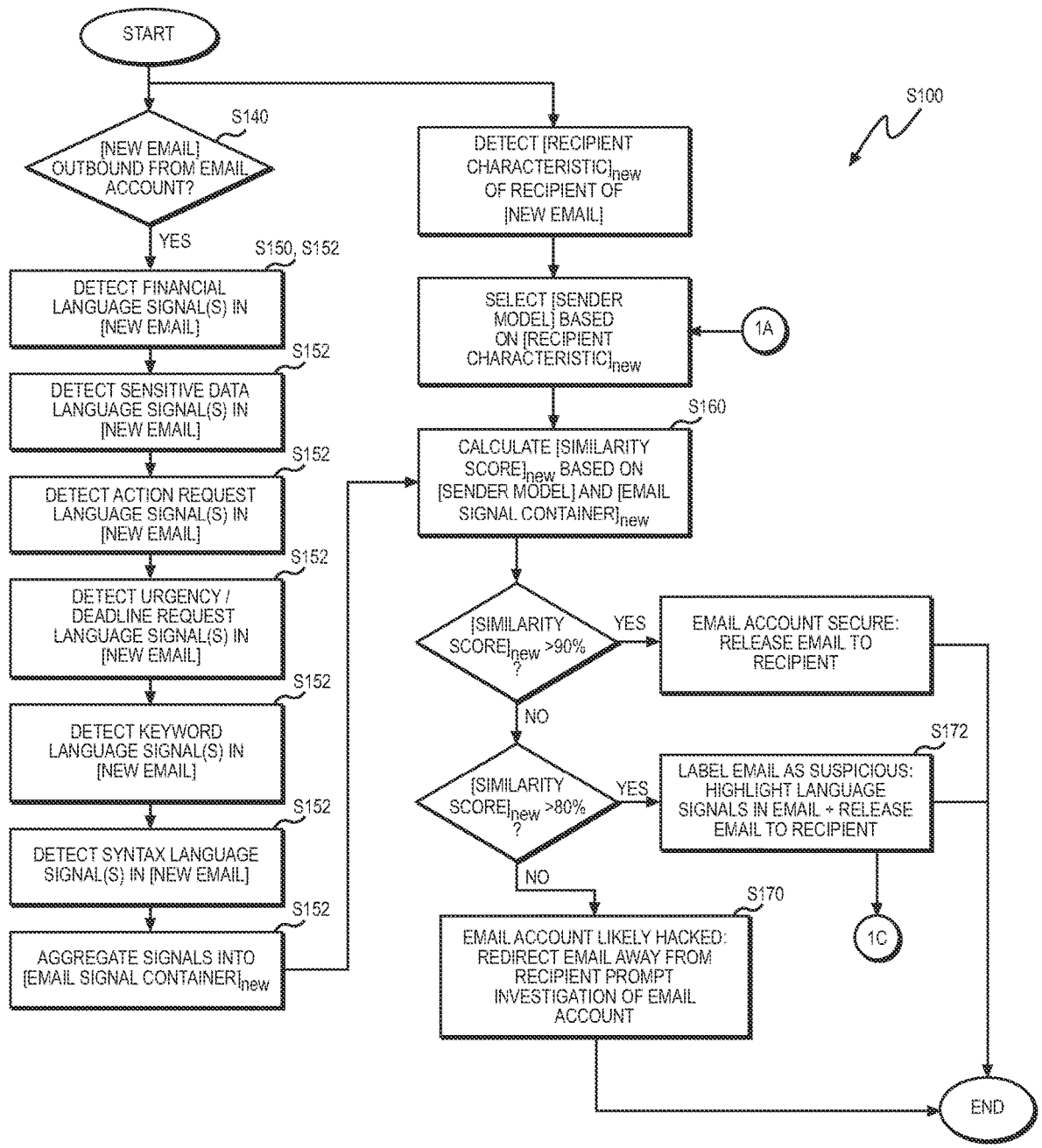
Figure 1C:
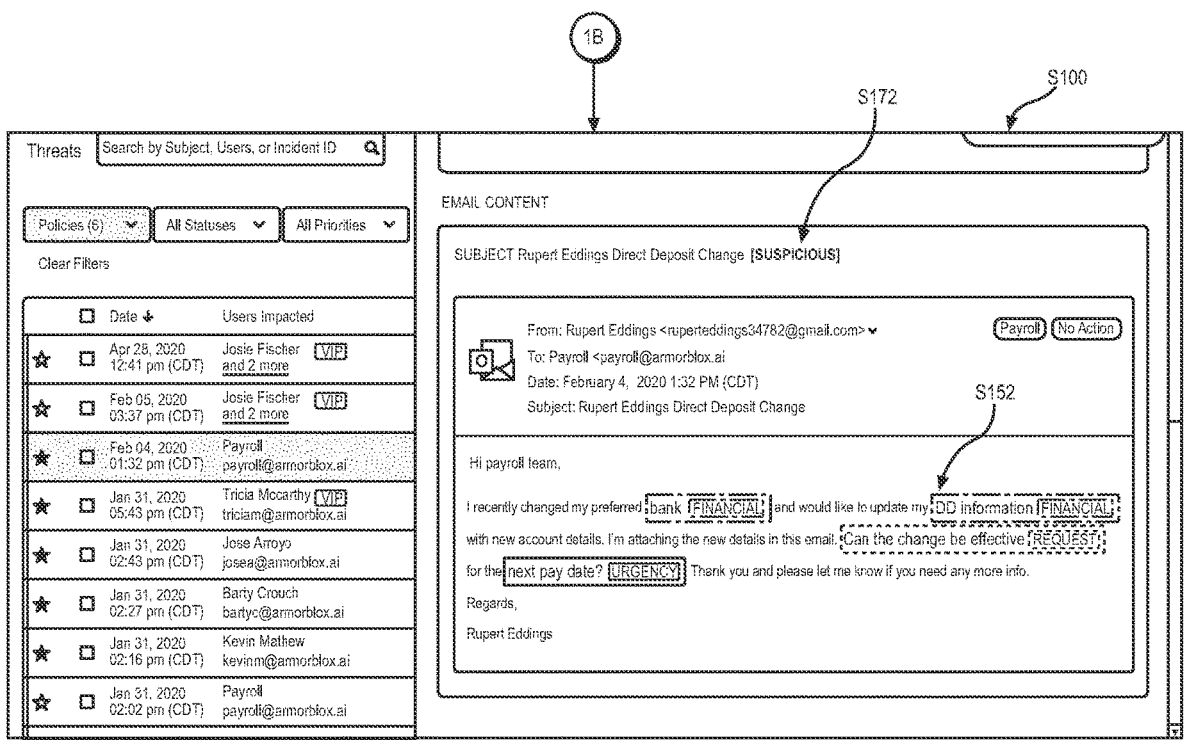

As shown in FIGS. 1A, 1B, and 1C, a first method for detecting email-based attacks includes, during an initial time period: accessing a first corpus of emails sent from a first email account prior to the initial time period in Block S110; correlating sequences of words, in bodies of emails in the first corpus of emails, with a first set of language signals in Block S120; aggregating the first set of language signals into a first sender model that represents combinations of language signals, in the first set of language signals, characteristic of language in bodies of emails sent from the first email account in Block S130; and associating the first sender model with the first email account in Block S132. The first method also includes, during a first time period succeeding the initial time period: accessing a first email outbound from the first email account and directed to a first recipient in Block S140; scanning a body of the first email for the first set of language signals in Block S150; correlating a first sequence of words, in the first email, with a financial signal in the first set of language signals in Block S152; correlating a second sequence of words, in the first email, with an action request signal in the first set of language signals in Block S152; calculating a first similarity score for the first email based on the financial signal detected in the first email, the action request signal detected in the first email, and the first sender model in Block S160; and, in response to the first similarity score falling below a threshold similarity, redirecting the first email away from the first recipient in Block S170.

One variation of the first method S100 includes, during an initial time period: accessing a first corpus of emails sent from a first email account prior to the initial time period in Block S110; correlating sequences of words, in bodies of emails in the first corpus of emails, with a first set of language signals in Block S120; aggregating the first set of language signals into a first sender model that represents combinations of language signals, in the first set of language signals, characteristic of language in bodies of emails sent from the first email account in Block S130; and associating the first sender model with the first email account in Block S132. The first method also includes, during a first time period succeeding the initial time period: accessing a first email outbound from the first email account and directed to a first recipient in Block S140; scanning a body of the first email for the first set of language signals in Block S150; correlating sequences of words, in the first email, with a first subset of language signals in the first set of language signals in Block S152; calculating a first similarity score for the first email based on the first subset of language signals detected in the first email and the first sender model in Block S160; and, in response to the first similarity score falling below a threshold similarity, flagging the first email as suspicious in Block S172 and redirecting the first email away from the first recipient in Block S170.

2. Applications

Generally, Blocks of the first method S100 can be executed by a computer system (e.g., an incoming mail server, a security server, a computer network): to detect language concepts (e.g., financial, sensitive information, action, urgency, deadline, and keyword language signals; syntax; spelling; subjects or topics) in a corpus of emails previously sent by a user; to develop a sender model that represents combinations of language concepts detected in these emails previously sent by the user; to intercept an email outbound from user's email account; to detect a set of language signals from the email; and to characterize similarity of the email to past emails sent by the user based on these language signals and combinations of language signals represented in the sender model. The computer system can then selectively: release the email to its designated recipient if this similarity exceeds a similarity range; write a suspicious email flag to the email and release the email to the recipient if this similarity falls within the similarity range; and quarantine the email if this similarity falls below the similarity range.

Therefore, the computer system can execute the first method S100 to: develop a sender model that (uniquely) describes combinations of language signals common in emails sent by the user; implement this sender model to detect emails—outbound from the user's email account— that contain language signals that deviate from combinations of language signals represented in the sender model; and selectively flag these emails as suspicious and/or automatically quarantine these emails accordingly. The computer system can thus execute Blocks of the first method S100 to automatically detect and quarantine malicious emails outbound from the user's email account, such as if the user's email account is compromised (or "hacked").

For example, authentic emails drafted by a particular user and sent from the particular user's email account may contain common combinations of language concepts, may exhibit similar syntax (e.g., grammar, punctuation, spelling, formatting), and may contain similar clusters of words in similar proximities. Conversely, if the user's email account is compromised, a malicious (e.g., "spoofed") email drafted by an attacker and outbound from the user's email account may exhibit different combinations of language concepts, syntax, and clusters of words. The computer system can thus: ingest a corpus of such authentic emails previously sent by the user; and train a sender model configured to ingest a new email—outbound from the user's email account—and to return a similarity score representing proximity of language concepts, syntax, and/or clusters of words in the new email to corresponding characteristics of the corpus of authentic emails previously sent from the user's email account.

Accordingly, the computer system can execute the first method S100 to intercept or access a new email outbound from the user's email account and to pass this new email (or language concepts, syntax, word clusters, etc. extracted from the new email) into the sender model. If the email is authentic (i.e., drafted by the user), the sender model may return a high similarity score (e.g., greater than 90%); and the computer system can then confirm authenticity of the email and release the email to its designated recipient. Conversely, if the email is inauthentic (e.g., drafted by an attacker with control of the user's email account), the sender model may return a low similarity score; and the computer system can then detect compromise of the user's email account and flag the email, quarantine the email, redirect the email away from the recipient, and/or prompt security personnel to investigate the user's email account for compromise.

The computer system can therefore execute the first method S100 to detect a compromised email account based on language contained in emails outbound from the email account and to automatically flag the email account for investigation in order to reduce or eliminate spoofing attacks, phishing attacks, data loss, and financial loss, etc. resulting from email recipients acting on requests in malicious emails outbound from the email account once compromised.

The first method S100 is described herein as executed by the computer system to detect and handle malicious emails and compromised email accounts. However, the computer system can additionally or alternatively execute similar methods and techniques to detect and handle malicious SMS messages, MMS messages, and/or messages within a workplace communication tool, etc. and to detect and handle compromised message accounts accordingly.

Furthermore, the first method S100 is described herein as executed by the computer system to train a sender model to characterize similarity between past emails sent from an email account and a new email outbound from the email account. However, the computer system can implement similar methods and techniques to train a group model to characterize similarity between past emails sent from a group of related email accounts (e.g., email accounts of users within a finance department of an organization; email accounts of executives within an organization; email accounts of users electrical engineers across multiple organizations) and a new email outbound from an email account within this group. Additionally or alternatively, the computer system can implement similar methods and techniques to train and implement multiple sender models for one user, such as including: an internal professional sender model configured to characterize similarity between past emails sent from an email account to recipients within a professional organization and a new email outbound from the email account to a recipient within this professional organization; an external professional sender model configured to characterize similarity between past emails sent from an email account to recipients outside of, but related to, a professional organization and a new email outbound from the email account to a recipient outside of, but related to, this professional organization; and a familial professional sender model configured to characterize similarity between past emails sent from an email account to friends and family of the user (i.e., outside of the professional organization) and a new email outbound from the email account to friends or family members of the user; etc.

3. Individual Sender Model Generation

The first method S100 includes, during an initial time period: accessing a first corpus of emails sent from a first email account prior to the initial time period in Block S110; correlating sequences of words, in bodies of emails in the first corpus of emails, with a first set of language signals in Block S120; aggregating the first set of language signals into a first sender model that represents combinations of language signals, in the first set of language signals, characteristic of language in bodies of emails sent from the first email account in Block S130; and associating the first sender model with the first email account in Block S132. Generally, in Blocks S110, S120, S130, and S132, the computer system: trains a sender model to characterize similarity between past emails sent from the user's email account and a new email outbound from the user's email account; and links this sender model to the user's email account, as shown in FIG. 1A.

3.1 Corpus of Past Emails

In one implementation, the computer system: accesses the email account; retrieves an entire corpus of emails from a sent folder in the email account; and executes methods and techniques described below to extract language signals from these emails and to train the sender model on these sent emails.

In one variation, the computer system can further filter the corpus of sent emails to include only emails sent within a recent time period (e.g., a past year) or to include a most recent quantity of (e.g., 2,000) sent emails.

Additionally or alternatively, the computer system can: retrieve email threads containing emails sent from the email account; remove emails, email bodies, and/or email metadata, etc. corresponding to emails in these emails threads, but not sent from the email account; and allocate the remaining emails for sender model training.

However, the computer system can retrieve and filter emails previously sent by the user from the email account in any other way and according to any other schema.

3.2 Email Interpretation and Language Signals

Block S120 of the first method S100 recites correlating sequences of words, in bodies of emails in the first corpus of emails, with a first set of language signals. Generally, in Block S120, the computer system can implement language models—such as natural language processing models or natural language understanding models tuned to particular language concepts—to detect words or phrases that represent critical language concepts in each email in the corpus of sent emails.

Additionally or alternatively, the computer system can implement natural language processing techniques to detect syntax (grammar, punctuation, spelling, formatting) characteristics of each email.

3.2.1 Financial Signal

In one implementation, the computer system selects a first email in the corpus of sent emails and implements a financial signal model to detect words and phrases related to financial concepts in the email, such as: PCI, PHI, PII, and/or other types of sensitive data. For example, the computer system can implement a natural language processing model trained on a financial services and financial transaction lexicon (hereinafter a "financial signal model") to detect words and phrases related to financial transactions in the email, such as: "bank" or "financial institution"; "DD info," "direct deposit info," or "direct-deposit information"; "buy a gift card"; "reimburse" or "pay you back"; and "BTC" or "Bitcoin."

Accordingly, the computer system can generate a set of financial signals that represent the types and/or frequencies of such finance-related words and phrases detected in the email. For example, for each word or phrase detected in the email by the financial signal model, the computer system can: normalize the word or phrase; and generate one financial signal containing the normalized language value. In this example, the computer system can: normalize "DD" to "direct deposit account;" normalize "bank" to "financial institution;" normalize "pay you back" to "reimburse"; and store these normalized values in discrete financial signals for this email.

In another example, the computer system can generate one financial signal representing the presence (or absence) of all finance-related words and phrases detected in the email. In this example, the computer system can also derive additional risk signals from these finance-related words and phrases detected in the email, such as: a frequency of finance-related words and phrases detected in the email or a ratio of finance-related words and phrases to other words counted in the email.

However, the computer system can implement any other method or technique to detect and represent finance-related concepts—present in the email—in a set of financial signals.

3.2.2 Sensitive Data Signal

Similarly, the computer system can implement a sensitive data model to detect words and phrases related to sensitive data in the email, such as: a username and password; bank account information (e.g., by detecting a sequence of numerical characters similar to a bank account or bank routing number); or a Social Security number. For example, the computer system can implement a natural language processing model trained on a sensitive data lexicon (hereinafter a "sensitive data model") to detect words and phrases representing sensitive data in the email.

Accordingly, the computer system can generate a sensitive data signal that represents the types and/or frequency of such sensitive words and phrases detected in the email. For example, for each word or phrase detected in the email by the sensitive data model, the computer system can: normalize the word or phrase; and generate one sensitive data signal containing the normalized language value. In this example, the computer system can: normalize "SSN" to "Social Security Number"; normalize "handle" to "username"; normalize "passcode" to "password"; normalize "ACCT" to "account number"; and store these normalized values in discrete financial signals for this email.

In another example, the computer system generates one sensitive data signal representing presence (or absence) of sensitive words and phrases detected in the email. In this example, the computer system can also derive and store a frequency of sensitive data detected in the email or representing a ratio of sensitive data to other words counted in the email, etc.

However, the computer system can implement any other method or technique to detect and represent sensitive concepts—present in the email—in a set of sensitive data signals.

3.2.2 Action Signal

Similarly, the computer system can implement an action signal model to detect words and phrases related to action requests in the email, such as: "Can the change be effective"; "Can you make this change"; "Let me know when you have made this change"; or "Can you please run over to the Safeway that's opposite our HQ and buy $2000 of iTunes gift cards?" For example, the computer system can implement a natural language processing model trained on an action request and prompt lexicon (hereinafter a "action signal model") to detect words and phrases related to action requests in the email.

Accordingly, the computer system can generate an action signal that represents the types and/or frequency of such action-related words and phrases in the email. For example, for each word or phrase detected in the email by the action signal model, the computer system can: normalize the word or phrase; and generate one action signal containing the normalized language value. In this example, the computer system can: normalize "Can the change be effective," "Can you make this change," "Let me know when you have made this change," etc. to "make a change"; and store these normalized values in discrete action signals for this email.

In another example, the computer system generates one action signal representing presence (or absence) of action requests detected in the email. The computer system can also derive and store a frequency of action requests detected in the email or representing a ratio of action requests to other words counted in the email, etc.

However, the computer system can implement any other method or technique to detect and represent action-related concepts—present in the email—in a set of action signals.

3.2.4 Urgency Signal

The computer system can also implement an urgency signal model to detect words and phrases related to urgency of an action request in the email, such as: "I need"; "right now"; or "We need this today." For example, the computer system can implement a natural language processing model trained on an urgency and social pressure lexicon (hereinafter an "urgency signal model") to detect words and phrases related to urgency in the email.

Accordingly, the computer system can generate an urgency signal that represents the types and/or frequency of such urgency-related words and phrases in the email. For example, for each word or phrase detected in the email by the urgency signal model, the computer system can normalize the word or phrase (e.g., by normalizing "I need," "right now," and "We need this today" to "urgent"); and generate one financial signal containing this normalized language value.

In another example, the computer system generates one urgency signal representing presence (or absence) of urgency-related words and phrases detected in the email. The computer system can also derive and store: a frequency of urgency-related words and phrases detected in the email; a ratio of urgency-related words and phrases to other words counted in the email; etc.

However, the computer system can implement any other method or technique to detect and represent urgency-related concepts—present in the email—in a set of urgency signals.

3.2.5. Deadline Signal

The computer system can additionally or alternatively implement a deadline signal model to detect words and phrases indicating a deadline of an action request in the email, such as: "within the next two hours"; "within two days"; "end of day"; "EOD"; "end of week"; or "next pay date." For example, the computer system can implement a natural language processing model trained on a deadline and time lexicon (hereinafter a "deadline signal model") to detect words and phrases related to deadlines in the email.

Accordingly, the computer system can generate a deadline signal that represents the types and/or frequency of such deadline-related words and phrases in the email. For example, for each word or phrase detected in the email by the deadline signal model, the computer system can: normalize the word or phrase (e.g., by normalizing "within the next two hours" and "end of day" to "deadline pending"); and generate one deadline signal containing the normalized language value.

In another example, the computer system can generate one deadline signal representing presence (or absence) of deadline-related words and phrases detected in the email. The computer system can also derive and store: a frequency of deadline-related words and phrases detected in the email; a ratio of deadline-related words and phrases to other words counted in the email; etc.

However, the computer system can implement any other method or technique to detect and represent deadline-related concepts—present in the email—in a set of deadline signals.

3.2.6 Keyword Signal

The computer system can additionally or alternatively implement a keyword signal model to detect words and phrases in the email that are analogous (i.e., similar or identical) to stored keywords or keyphrases, such as: an internal project name specified by the organization; "NDA"; and "invoice."

Accordingly, the computer system can generate a keyword signal that represents the types and/or frequency of such keywords and keyphrases detected in the email.

However, the computer system can implement any other method or technique to detect and represent keywords and keyphrases—present in the email—in a set of keyword signals.

3.2.7 Email Subject Line and Attachments

The computer system can thus implement various signal models to detect concepts in the body of the email and to generate language signals accordingly.

The computer system can similarly implement these signal models to detect concepts in the subject line of the email and to generate language signals accordingly.

Additionally or alternatively, the computer system can implement these signal models to detect concepts in the attachment in this email and to generate language signals accordingly. For example, the computer system can scan the email for attachments. In response to detecting an attachment in the email, the computer system can extract a set of characters from the attachment, such as by implementing optical character recognition to extract letters, words, and phrases from the attachment. The computer system can then implement methods and techniques described herein to: scan the set of characters for the set of language signals; correlate a sequence of words, in the attachment, with a language signal; and store representations of combinations of language signals (e.g., financial, action request, and other signals) detected in the email body with language signals detected in the set of characters extracted from the attachment.

3.2.8 Syntax, Grammar, Spelling

In one variation, the computer system further implements syntax analysis techniques to detect grammar, punctuation, spelling, and/or formatting in the email. For example, the computer system can implement spell-check, grammar-check, and other syntax analysis techniques to detect and characterize presence and distribution of: commas; periods; colons; semi-colons; bullets and numbering; spelling and grammatical errors; and/or salutations; etc. in the email.

The computer system can additionally or alternatively characterize linguistic complexity of the email, such as by implementing syntax analysis techniques to calculate scores for: syntagmatic complexity (e.g., based on word length); paradigmatic complexity (e.g., based on variety of grammatical categories); organizational complexity (e.g., based on variety of component arrangement, phonotactic restrictions, and word order); and/or hierarchic complexity (e.g., based on recursion and lexical-semantic hierarchies) of language contained in the body of the email.

In this variation, the computer system can store quantitative values for presence of various syntactical features (e.g., punctuating, errors) in the email and scores for linguistic complexity of the email. Additionally or alternatively, the computer system can generate a sparse representation (or "fingerprint") of punctuation and formatting, etc. in the email.

However, the computer system can detect and store representations of any other syntactical features of the email in any other way.

3.2.8 Email Signal Container

The computer system can then aggregate these language signals (e.g., all financial, action, urgency, deadline, and keyword signals, and syntactical features, etc.) extracted from the email into an email signal container. The computer system can also write email metadata to this email signal container, such as: a sender email address; a recipient email address; and a timestamp of the email.

Therefore, the computer system can generate an email signal container that defines a compressed representation of language concepts contained in the email and that are representative of emails drafted and sent by the user.

The computer system can also store this email signal container in an email signal database associated with the user and the email account.

The computer system can repeat this process for each other email in the corpus of emails previously sent from the email account.

3.3 Model Generation

Block S130 of method recites aggregating the first set of language signals into a first sender model that represents combinations of language signals, in the first set of language signals, characteristic of language in bodies of emails sent from the first email account; and Block S132 of the first method S100 recites associating the first sender model with the first email account. Generally, in Blocks S130 and S132, the computer system can compile email signal containers—representing language concepts contained in the corpus of emails—into a sender model that represents combinations of language concepts representative of (e.g., common to, typical of) authentic emails sent from the email account.

More specifically, the computer system can: scan bodies of emails in the first corpus of emails for a set of language signals (e.g., financial signals, sensitive information signals, action signals, urgency signals, deadline signals, keyword signals, syntax signals); detect combinations of language signals—in the set of language signals—in bodies of emails in the first corpus of emails in Block S120; and then train a sender model to calculate similarities of new emails sent from the email account and the corpus of emails previously sent from the email account based on a) combinations of language signals in bodies of emails in the corpus of sent emails and b) language signals detected in new emails sent from the sender account.

3.3.1 Model Generation: Nearest Neighbor

In one implementation, the computer system: stores the email signal containers—derived from the corpus of emails—as a set of vectors; locates these vectors to an n-dimensional features space; and stores this n-dimensional feature space as the sender model of the email account. In this implementation, the computer system can: implement similar methods and techniques to generate an email signal container for a new email outbound from the email account; locate a target vector based on the email signal container in the n-dimensional feature space; characterize proximity of the target vector to other vectors representing authentic emails in the n-dimensional feature space; and calculate a similarity score for the new email proportional to proximity of the target vector to these other vectors in the n-dimensional feature space. For example, the computer system can: implement k-nearest neighbor techniques to identify a particular cluster of vectors in the n-dimensional feature space nearest the target vector that represents the new email; calculate an error between the target vector and the particular cluster of vectors (e.g., based on a combination of Euclidean distances between the target vector and the vectors in the particular cluster); and calculate a similarity score for the new email inversely proportional to this error.

3.3.2 Model Generation: Neural Network

In another implementation, the computer system implements artificial intelligence, machine learning, regression, and/or other techniques to train a neural network to distinguish between emails sent from the email account and emails sent from other email accounts based on the corpus of past emails sent from the email account and emails sent from other email accounts.

In this implementation, the computer system can access a corpus of alternate emails sent from alternate email accounts (i.e., other than the particular email account of the particular user), such as emails sent from other email accounts: within the same group within a particular organization as the particular email account; within the same organization as the particular email account; internal and external to the particular organization and associated with similar job titles as the particular user (e.g., executive, administrator, engineer, intern); and/or associated with users or organizations within the same geographic region as the particular user; etc. The computer system can then implement methods and techniques described above to: detect language signals in these other emails; generate email signal containers for these other emails; and label these email signal containers as originating from other than the particular email account (e.g., "inauthentic"). The computer system can similarly label email signal containers derived from emails sent from the email account as originating from the particular email account (e.g., "authentic").

Additionally or alternatively, the computer system can: access a corpus of malicious emails related to or involved in past known email-based attacks; detect language signals in these malicious emails; generate email signal containers for these malicious emails; and label these email signal containers as originating from other than the particular email account (e.g., "inauthentic" or "malicious").

The computer system can then train a neural network (e.g., a convolution neural network) to distinguish between a) "authentic" email signal containers corresponding to emails sent from the particular email account and b) "inauthentic" email signal containers corresponding to emails sent from other than the particular email account. For example, the computer system can configure the neural network to return a similarity score representing proximity of a new email to the corpus of authentic emails and representing distance from the corpus of inauthentic emails. The computer system can store this neural network as the sender model for the particular email account.

3.3.3 Model Generation: Deep Learning

In another implementation, the computer system implements deep learning techniques to train a neural network to distinguish between emails sent from the email account and emails sent from other email accounts based on the corpus of past emails sent from the email account and emails sent from other email accounts.

However, the computer system can implement any other method or technique to generate and store the sender model for the email account based on emails previously sent from the email account.

4. New Outbound Email

Block S140 of the first method S100 recites accessing a first email outbound from the first email account and directed to a first recipient during a first time period succeeding the initial time period. Generally, in Block S140, the computer system can access or intercept a new email outbound from the email account, shown in FIG. 1B. For example, the computer system can intercept the new email at a SMTP or IMAP server before the email is delivered to its designated recipient, such as before the email is delivered to a recipient address within the same domain as the email account or before the email leaves the domain of the email account.

More specifically, the computer system can access or intercept emails sent from the email account to recipient addresses within the domain and to recipient addresses outside of the domain of the email account.

5. Email Similarity

The first method S100 also includes: scanning a body of the first email for the first set of language signals in Block S150; correlating a first sequence of words, in the first email, with a financial signal in the first set of language signals in Block S152; correlating a second sequence of words, in the first email, with an action request signal in the first set of language signals in Block S152; and calculating a first similarity score for the first email based on the financial signal detected in the first email, the action request signal detected in the first email, and the first sender model in Block S160. Generally, in Blocks S150 and S152, the computer system can implement methods and techniques described above to: detect and extract language signals from the email; and compile these language signals into an email signal container. The computer system can then feed this email signal container into the sender model to calculate a similarity score for the new email in Block S160, as described above.

In one example, the computer system can: generate an email signal container representing language signals detected in the new email outbound from the email account; generate a target vector based on the email signal container; locate the target vector in the n-dimensional feature space defining the sender model for the email account; implement k-nearest neighbor techniques to identify a particular cluster of vectors in the n-dimensional feature space nearest the target vector; calculate an error between the target vector and the particular cluster of vectors (e.g., based on a combination or composite of Euclidean distances between the target vector and other the vectors in the particular cluster); and calculate a similarity score for the new email inversely proportional to this error.

In another example, the computer system can: generate an email signal container representing language signals detected in the new email outbound from the email account; and inject this email signal container into the sender model defining a neural network. In this example, the sender model can then return a similarity score representing: proximity of the new email signal container for the new email to the corpus of authentic emails previously sent from the email account; and an inverse of proximity of the new email signal container from the corpus of inauthentic emails.

However, the computer system can calculate a similarity score for the new email in any other way.

6. Attack Response

Block S170 of the first method S100 recites, in response to the first similarity score falling below a threshold similarity, redirecting the first email away from the first recipient in Block S170. Generally, in Block S170, the computer system can selectively release the email to the recipient, remediate the current email for review by security personnel, or automatically block and archive the email based on a degree of similarity of the email to past emails sent from the email account—that is based on the similarity score of the email, which represents authenticity of the email, shown in FIG. 1B.

For example, the computer system can: quarantine the mail to the recipient's quarantine folder; soft-delete the email; permanently delete the email; block the email from delivery to be recipient's email inbox; insert a warning banner—identifying the email as malicious or suspicious— into the email; or write a malicious or suspicious flag to metadata or to a header of the email. In this example, the computer system can additionally or alternatively interface with an email administrator to selectively assign (or "configure") these automatic actions for emails outbound from the email account, a group of email accounts, or an email domain more generally based on similarity scores of these emails.

In one implementation, the computer system flags the email account as compromised and automatically quarantines the new email if the similarity score of the new email falls below a threshold similarity (e.g., 70%), Alternatively, the computer system can flag the email account as compromised in response to detecting more than a threshold quantity of emails—with similarity scores below the threshold similarity—sent from the email account within a target time period, such as: two or more low-similarity score emails in one hour; four or more low-similarity score emails in one day; or low-similarity score emails specifying ten or more recipients within one day. For example, the computer system can calculate a similarity score for the new email based on a financial signal detected in the new email, an action request signal detected in the new email, and the sender model. Then, in response to the similarity score of the new email falling below the threshold similarity, the computer system can: flag the new email as malicious (or inauthentic); redirect the new email away from the first recipient; flag the email account as compromised; and/or prompt security personnel to investigate the email account for compromise.

In this implementation, the computer system can flag the new email as suspicious, but release the new email to its designated recipient in response to the similarity score of the new email falling between the threshold similarity and a minimum similarity (e.g., between 70% and 85%). For example, in response to the similarity score of the new email falling between the threshold and minimum similarities, the computer system can: write a "suspicious email" flag to the email for the recipient to view; or send the new email to a quarantine folder in the recipient's email account (e.g., rather than redirecting the email to security personnel). More specifically, in response to the similarity score of the new email exceeding the threshold similarity and falling below the minimum similarity, the computer system can: label the new email as suspicious; and release the new email to its recipient.

Furthermore, the computer system can release the new email to the recipient in response to the similarity score of the new email exceeding the minimum similarity. For example, in response to the similarity score of the new email exceeding the threshold and minimum similarities, the computer system can: release the new email to its recipient; and label the email account as secure.

6.1 Language Signal Visualization

In one implementation shown in FIG. 1C, the computer system interfaces with a security portal to: render the email; and highlight, color-code, and label words and phrases in the subject line and body of the email corresponding to each language signal derived from the email. For example, the security portal can present: words corresponding to financial signals highlighted in GREEN and appended with "FINANCIAL" labels; words corresponding to action signals highlighted in PURPLE and appended with "ACTION" labels; words corresponding to urgency signals highlighted in ORANGE and appended with "URGENCY" labels; words corresponding to deadline signals highlighted in YELLOW and appended with "DEADLINE" labels; and/or words corresponding to sensitive data signals highlighted in GRAY, including Social Security numbers appended with "SSN" labels and detected bank account and routing numbers appended with "BANK ACCOUNT" labels.

The computer system and the security portal can thus cooperate to enable security personnel to quickly identify and distinguish critical words and phrases—in the new email—that may indicate an attempted attack or malicious intent of the new email.

In one implementation, if the similarity score of the new email falls below the threshold similarity, the computer system: redirects the email to a quarantine folder accessible via the security portal; and withholds the email from the recipient's inbox, quarantine, or spam folder, etc. unless manually released by security personnel. In this implementation, the computer system then: highlights a first sequence of words in the email—corresponding to a first (e.g., financial) signal with a first color (e.g., "green") according to a first visual highlighting scheme associated with the first signal; and highlights a second sequence of words in the email—corresponding to a second (e.g., action request) signal with a second color (e.g., "red") according to a second visual highlighting scheme associated with the second signal; etc. Then, in response to selection of the email from the quarantine folder, the security portal (or other email viewer) can: render the email with the first sequence of words highlighted in the first color and with the second sequence of words highlighted in the second color; label the first color as corresponding to the first signal type (e.g., a financial signal); and label the second color as corresponding to the second signal type (e.g., an action request signal).

Therefore, in response to identifying the new email as malicious (or inauthentic), the computer system can: annotate a first sequence of words in the new email corresponding to a first (e.g., financial) language signal according to a first visual highlighting scheme associated with the first language signal; and annotate a second sequence of words in the new email corresponding to a second (e.g., action) language signal according to a second visual highlighting scheme— different from the first visual highlighting scheme—associated with the second language signal in Block S174; etc. The computer system then: redirects the new email to a quarantine folder; and prompts security personnel to investigate the new email account for compromise in Block S170.

6.2 Recipient Inbox to Recipient Quarantine

In one variation, if the similarity score for the new email is less than the minimum similarity, but greater than the threshold similarity, the computer system can redirect the new email: from an email inbox within an email account at the recipient address; to a quarantine folder within the email account at the recipient address.

In one implementation, an email viewer associated with the email account at the recipient address can then: present the new email to the recipient upon selection of the email from the quarantine folder; render a flag or warning that the new email represents a possible attack; and selectively highlight phrases in the email corresponding to various language signals detected in the email. More specifically, in response to selection of the new email from the quarantine folder, the email viewer can render the email: with a similarity score; with a low similarity score alert; with a first sequence of words corresponding to a first language signal highlighted according to a first visual highlighting scheme; and/or with a second sequence of words corresponding to a second language signal highlighted according to the second visual highlighting scheme; etc.

Like the security portal described above, the quarantine folder can present a user interface for confirmed malintent of emails loaded into the quarantine folder at the recipient's address. The recipient may then confirm the email is malicious via the user interface within the quarantine folder or by forwarding the email to the security portal or other email security administrator. Alternatively, the recipient may confirm the email is authentic via the user interface within the quarantine folder or by moving the email into her email inbox. The computer system can then: log this response from the recipient; label the email with this response; and implement methods and techniques described above and below to retrain the sender model to reflect malintent or authentic characteristics of the email thus confirmed by the recipient.

In this implementation, the computer system can later implement methods and techniques described above to: intercept a second email outbound from the email account; scan a second body of the second email for the set of language signals; correlate a third sequence of words, in the email, with the financial signal; correlate a fourth sequence of words, in the email, with the action request signal; and calculate a second similarity score for the second email based on these language signals and the revised sender model. Then, in response to the second similarity score exceeding the threshold similarity score, the computer system can: annotate the third sequence of words in the second email according to the first visual highlighting scheme associated with the financial signal; annotate the fourth sequence of words in the second email according to the second visual highlighting scheme associated with the action request signal; and release the second email to an email inbox within the email account at a recipient address specified in the second email. Furthermore, in response to selection of the second email from this email inbox, the email viewer can render the second email with the third sequence of words highlighted according to the first visual highlighting scheme and with the fourth sequence of words highlighted according to the second visual highlighting scheme.

Therefore, in this implementation, the email viewer can highlight language signals in a new email characterized as malicious in order to enable the recipient to quickly identify an attack vector of the new email, to distinguish between language typical of an authentic email from the email account and content in the new email, and to verify malintent of the new email. The email viewer can implement similar methods and techniques to highlight language signals in a second email characterized as authentic in order to enable the recipient to quickly review and extract critical information from the second email, thereby enabling the recipient to improve her email comprehension and email review efficiency.

6.3 Model Retraining

In one variation, if the computer system fails to identify a malicious email as an attack and erroneously passes the email to the recipient (i.e., a false negative), the recipient may manually identify the email as inauthentic and report the email to security personnel. The security personnel may then: review the email; identify the email as inauthentic; write an inauthentic type label to this email; and trigger the computer system to retrain the sender model to identify emails—analogous to the new email—as inauthentic.

The computer system then: creates or retrieves a new email signal container for this new email; and updates (or "retrains") the sender model associated with the email account accordingly.

Similarly, the security personnel may review an email in quarantine, identify the email as authentic, release the email to its recipient, and elect to prevent quarantine of similar emails from the email account in the future. The computer system can therefore: retrieve or generate an email signal container for this new email; write an authentic flag to this email signal container; add this email signal container to the corpus of past emails; and retrain the sender model based on this updated corpus of emails—and thus further based on this new email identified by the computer system as authentic.

7. Email Thread

In one variation, the computer system implements methods and techniques described above to calculate a similarity score for bodies of emails—within a single email thread— sent from the email account based on the sender model and language signals extracted emails in the email thread sent from the email account.

In one implementation, the computer system intercepts or accesses a new email that includes past email content (i.e., an "email thread") below a main body of text in the new email. Accordingly, the computer system: isolates segments of the new email containing content sent specifically from the email account and excluding content sent from other users; implements methods and techniques described above to extract language signals from these segments of the new email containing content sent specifically from the email account; and calculates a similarity score for the email thread based on these language signals and the sender model. The computer system can then selectively release, flag, or redirect the new email based on this similarity score, as described above.

8. Multiple Models Per User

In one variation shown in FIG. 1A, the computer system trains and implements multiple sender models for the email account, each corresponding to a different recipient type or recipient characteristic, such as: a work associate internal to the user's organization; a work associate external to the user's organization; a family member or personal friend of the user; and/or other uncategorized recipients or recipients not affiliated with the user.

In particular, the computer system can group emails previously sent from the user's email account based on types or characteristics of recipients specified in these sent emails. For example, the computer system can: aggregate a set of sent emails containing recipient email addresses including the same domain as the user's email account; define an "internal work associate" group containing these emails; and train an "internal work associate" sender model based on this group of emails. In this example, the computer system can also: access the user's digital address book; query the digital address book for types or characteristics (e.g., "personal," "work," "home," "emergency contact") of recipients specified in other emails previously sent by the user; segment these emails by recipient type or characteristic into an "external work associate" group and a "family and friends" group; and train "external work associate" and "family and friends" sender models accordingly. The computer system can also: aggregate remaining or sent emails into an "uncategorized" group; and train an "uncategorized" sender model based on this group of uncategorized emails.

Later, upon accessing or intercepting a new email sent from the email account, the computer system can: identify a type or characteristic of the recipient specified by the new email (e.g., based on an email address domain of the recipient or a contact type label in a contact card associated with the recipient in the user's digital address book); select a particular sender model—from the set of sender models associated with the user—corresponding to the recipient type or characteristic; implement the foregoing methods and techniques to calculate a similarity score for the new email based on the particular sender model; and selectively release, flag, or quarantine the new email based on the similarity score.

In this variation, the computer system can also implement different similarity thresholds for each sender model based on risks associated with malicious emails sent from the email account to recipients of corresponding characteristics. For example, the computer system can: implement a similarity threshold of 90% for the "external work associate" sender model (e.g., to avoid injury to client, customer, or vendor relationships resulting from release of a malicious email from a hacked email account); 80% for the "internal work associate" sender model (e.g., to avoid data or financial loss from action on an internal malicious email while also enabling the user to successfully send authentic emails with a wider range of formal and informal language); 75% for the "family and friends" sender model (e.g., who may have less access to sensitive data and who may be better able to distinguish an inauthentic email from the user); and 70% for the "uncategorized" sender model.

Therefore, the computer system can: access a first corpus of emails sent from the email account to a first set of recipients associated with a first recipient characteristic (e.g., a professional affiliation with the first email account) prior to a setup period; correlate sequences of words, in bodies of emails in the first corpus of emails, with a first set of language signals; aggregate the first set of language signals into a first sender model that represents combinations of language signals characteristic of language in bodies of emails sent from the email account to recipients associated with the first recipient characteristic; and associate the first sender model with the email account and the first recipient characteristic. Similarly, the computer system can: access a second corpus of emails sent from the email account to a second set of recipients associated with a second recipient characteristic (e.g., a personal affiliation with the first email account) prior to the setup period; correlate sequences of words, in bodies of emails in the second corpus of emails, with a second set of language signals; aggregate the second set of language signals into a second sender model that represents combinations of language signals characteristic of language in bodies of emails sent from the email account to recipients associated with the second recipient characteristic; and associate the second sender model with the email account and the second recipient characteristic.

Later, the computer system can: access a first email outbound from the email account and directed to a first recipient associated with the first recipient characteristic; scan a body of the first email for the first set of language signals; correlate sequences of words, in the first email, with a first subset of language signals in the first set of language signals; identify the first recipient of the first email as associated with the first recipient characteristic; calculate a first similarity score for the first email based on the first subset of language signals detected in the first email and the first sender model; and flag the first email or redirect the first email away from the first recipient in response to the first similarity score falling below a first threshold similarity associated with the first sender model. Similarly, the computer system can: access a second email outbound from the email account and directed to a second recipient associated with the second recipient characteristic; scan a body of the second email for the second set of language signals; correlate sequences of words, in the second email, with a second subset of language signals in the second set of language signals; identify the second recipient of the second email as associated with the second recipient characteristic; calculate a second similarity score for the second email based on the second subset of language signals detected in the second email and the second sender model; and release the second email to the second recipient in response to the second similarity score exceeding a second threshold similarity associated with the second sender model.

9. New User with No Email History

Figure 2:
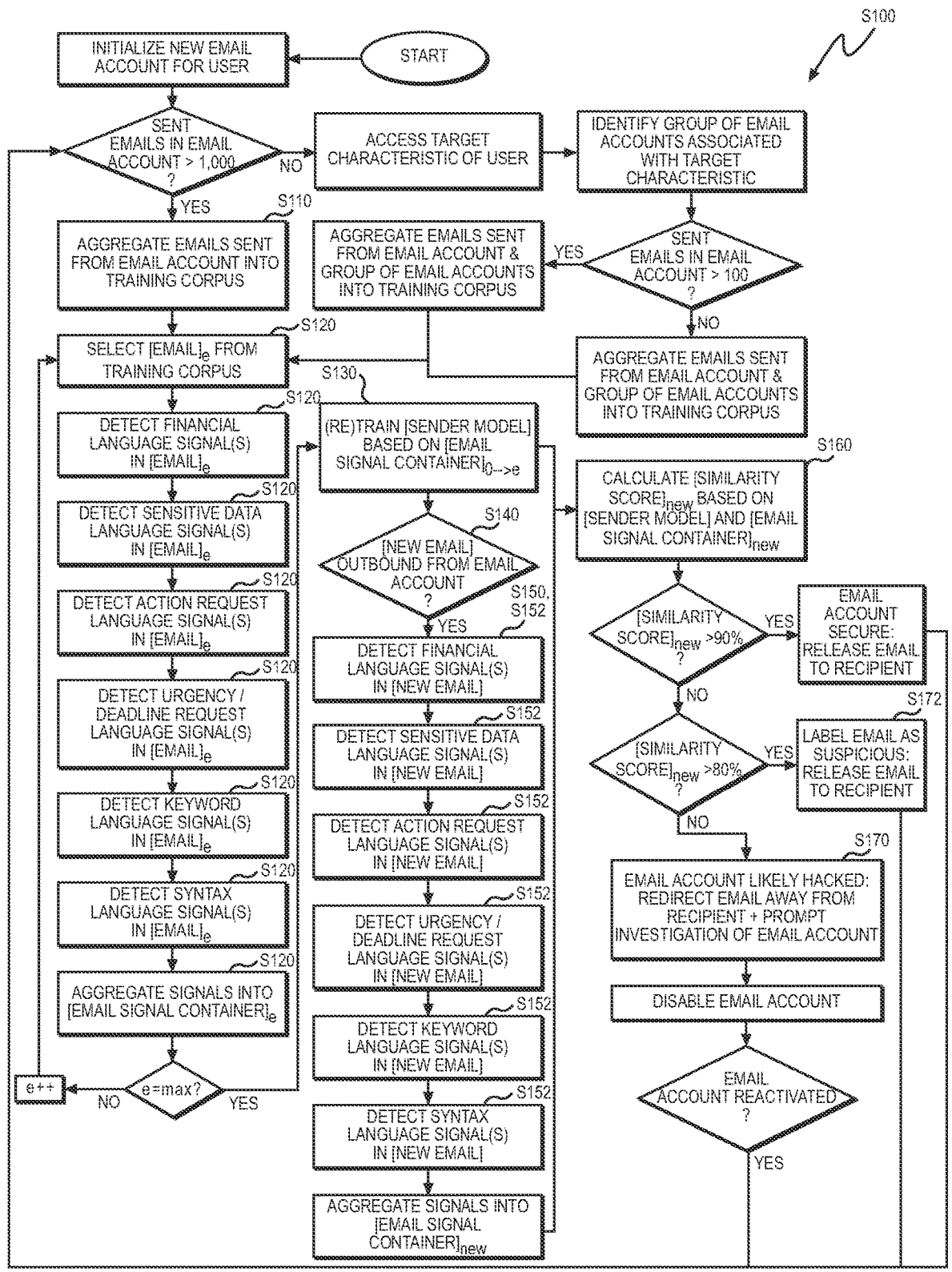
FIG. 2 is a flowchart representation of one variation of the first method.

In another variation shown in FIG. 2, if little or no sent email history exists for the email account (e.g., if the email account is newly-created), the computer system can: aggregate emails sent from other email accounts, such as within the same organization, within the same group within an organization, or associated with users exhibiting similar characteristics (e.g., geographic location, job title or position, education); train a group model based on language signals detected in these emails sent from other email accounts; and implement this group model to calculate similarity scores for new emails outbound from the email account, such as until the user has sent a sufficient quantity of emails to retrain a (unique) sender model for the email account.

9.1 Same Group/Organization

In one implementation, during a setup period soon after creation of a new email account with an email domain, the computer system can implement methods and techniques described above to: access a corpus of emails sent from email accounts within a first group of users within the email domain; correlate sequences of words, in bodies of emails in the corpus of emails, with a set of language signals; aggregate the set of language signals into a group sender model that represents combinations of language signals, in the set of language signals, characteristic of language in bodies of emails sent from email accounts in the first group of users; define a threshold group similarity for the group sender model; and associate the group sender model with the first email account.

Later, the computer system: accesses an email outbound from the new email account and directed to a recipient; scans a body of the email for the first set of language signals; correlates sequences of words, in the email, with a subset of language signals in the set of language signals; calculates a similarity score for the email based on the subset of language signals and the group sender model; and selectively flags, quarantines, or releases the email to the recipient based on the similarity score and the threshold group similarity.

For example, the computer system can: generate the group sender model that represents combinations of language signals characteristic of language in bodies of emails sent from email accounts of the first group of users within a department within an organization associated with the email domain; and associate the group sender model with the new email account in response to activation of the new email account for a new user within the first group of users in the department within the organization.

Later, in response to a quantity of emails sent from the new email account exceeding a threshold quantity (e.g., 1,000), the computer system can execute methods and techniques described above to: detect language signals in the emails sent from the email account; and aggregate these language signals into a sender model specific to the email account.

9.2 Custom Sender Model Transition

As the user sends more emails from the email account over time, the computer system can: combine language signals detected in these user-drafted emails and email from other related email accounts to retrain the group model specific to the user, such as after the user sends a first quantity of emails; and later combine language signals detected only in user-drafted emails to train a new sender model specific to the user, such as after the user sends a second, greater quantity of emails, shown in FIG. 2.

For example, in response to the quantity of emails sent from the new email account falling below a first threshold quantity (e.g., 100), the computer system can: retrieve a particular characteristic of the user (e.g., a department, within an organization, employing the user; a job title or description; an office location within an organization) associated with the new email account; access a first corpus of emails sent from a set of email accounts associated with a group of users exhibiting or associated with the particular characteristic (e.g., employed within the department within the same organization); correlate sequences of words, in bodies of emails in the first corpus of emails, with a set of language signals; aggregate this set of language signals into a group model; and associate the group model with the new email account.

Then, in response to the quantity of emails sent from the new email account exceeding the first threshold quantity (e.g., 100), the computer system can train an initial sender model for the email account based on both: language signals derived from emails sent from the new email account; and language signals derived from the first corpus of emails. The computer system can then associate this initial sender model with this email account. In this implementation, the computer system can also: associate both the initial sender model and the group model with the email account; calculate a sender similarity score for a new email based on the initial sender model; and calculate a group similarity score for the new email based on the group model; and selectively release, flag, or redirect the new email based on these sender and group similarity scores. For example, the computer system can: quarantine the new email if the sender similarity score falls below a threshold sender similarity (e.g., 60%) and if the group similarity score falls below a threshold group similarity (e.g., 70%); flag the new email as suspicious and release the new email to its recipient if the sender similarity score falls below the threshold sender similarity and if the group similarity score exceeds the threshold group similarity (or vice versa); and release the new email to its recipient if the sender similarity score exceeds the threshold sender similarity and if the group similarity score exceeds the threshold group similarity.

Later, in response to the quantity of emails sent from the new email account exceeding a second threshold quantity (e.g., 1,000), the computer system can retrain the sender model based exclusively on language signals derived from emails sent from the new email account (i.e., excluding set of language signals derived from the first corpus of emails sent from other email accounts).

10. Group Model

In one variation, the computer system additionally or alternatively: generates a group model based on language signals detected in emails sent from a set of email accounts associated with users exhibiting a common characteristic; and implements this group model to detect authenticity of emails sent from email accounts in this group.

For example, the computer system can implement methods and techniques described above to segment a population of email accounts into email account groups: associated with a particular department within an organization; associated with a particular leadership group with an organization; associated with a particular job title or description (e.g., executive, engineer, intern) within an organization; associated with a particular characteristic across organizations within a market sector (e.g., all nurses with medical clinics within a geographic region); etc. The computer system can thus generate and implement one group model to predict authenticity of emails sent from many email accounts within a corresponding group.

11. Recipient Model

Figure 3:
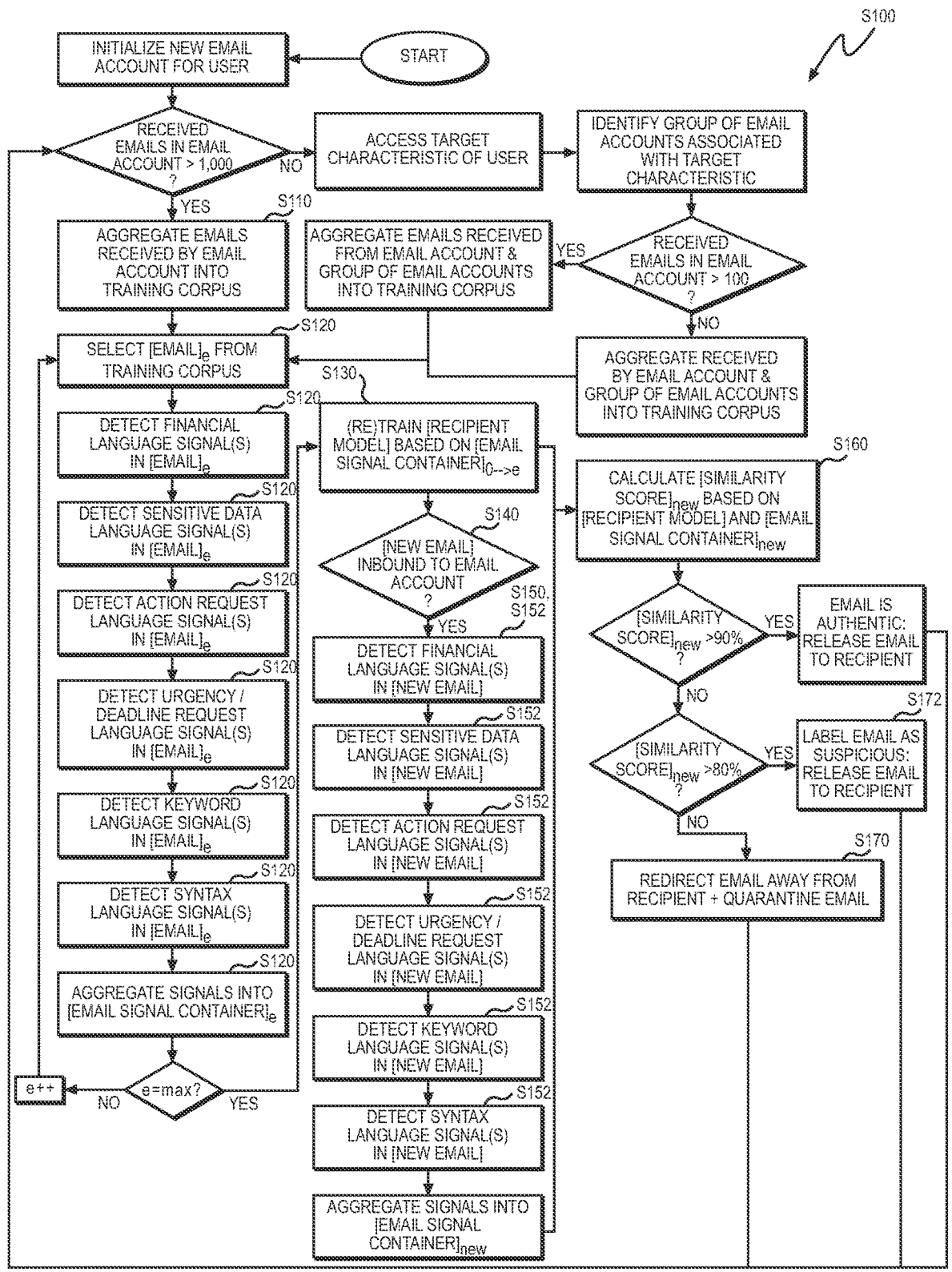
FIG. 3 is a flowchart representation of one variation of the first method.

In one variation shown in FIG. 3, the first method S100 includes, during an initial time period: accessing a first corpus of emails inbound to a first email account prior to the initial time period in Block S110; correlating sequences of words, in bodies of emails in the first corpus of emails, with a first set of language signals in Block S120; aggregating the first set of language signals into a first recipient model that represents combinations of language signals, in the first set of language signals, characteristic of language in bodies of emails received at the first email account in Block S130; and associating the first recipient model with the first email account in Block S132. The first method also includes, during a first time period succeeding the initial time period: accessing a first email inbound to the first email account in Block S140; scanning a body of the first email for the first set of language signals in Block S150; correlating sequences of words, in the first email, with a first subset of language signals in the first set of language signals in Block S152; calculating a first similarity score for the first email based on the first subset of language signals detected in the first email and the first recipient model in Block S160; and, in response to the first similarity score falling below a threshold similarity, flagging the first email as suspicious in Block S172 and redirecting the first email away from the first email account in Block S170.

Generally, in this variation, the computer system can implement methods and techniques described above to: aggregate a corpus of received emails previously received by (i.e., rather than sent from) an email account; detect language signals in this corpus of received emails; and generate a recipient model based on these language signals. In particular, the computer system can train the recipient model to return a similarity score for an email—inbound to the email account—that represents a magnitude of similarity language concepts in the inbound email to other, authentic (or benign, not malignant) emails previously received at the email account. Accordingly, the computer system can selectively release, flag, or redirect the inbound email based on this similarity score of the new email, as described above.

More specifically, authentic emails inbound to a particular user may contain common combinations of language concepts, may exhibit similar syntax (e.g., grammar, punctuation, spelling, formatting), and may contain similar clusters of words in similar proximities. For example, an employee with well-defined responsibilities within an organization may receive similar requests and actions via email over time from authentic senders within and/or outside of the organization. However, a malicious email, inbound to the user's email account (e.g., from a compromised sender), may exhibit different combinations of language concepts, syntax, and clusters of words. The computer system can thus: ingest a corpus of authentic emails previously received by the user; and train a recipient model configured to ingest a new email—inbound to the user's email account—and to return a similarity score representing proximity of language concepts, syntax, and/or clusters of words in the new email to corresponding characteristics of the corpus of authentic emails previously received by the user's email account.

Accordingly, the computer system can execute the first method S100 to intercept or access a new email inbound to the user's email account and to pass this new email (or language concepts, syntax, word clusters, etc. extracted from the new email) into the recipient model. If the email is authentic (i.e., drafted by an authentic sender from a secure email account), the recipient model may return a high similarity score (e.g., greater than 90%); and the computer system can then confirm authenticity of the email and release the email to the recipient. Conversely, if the email is inauthentic (e.g., drafted by an attacker with control of the user's email account), the recipient model may return a low similarity score; and the computer system can then detect compromise of the sender's email account and flag the email, quarantine the email, and/or redirect the email away from the recipient.

11.1 Multiple Recipient Models

As described above regarding the sender model, the computer system can similarly generate: group recipient models based on emails received by multiple email accounts associated with users exhibiting a common characteristic; hybrid group-and-user recipient models based on emails received by multiple email accounts associated with users exhibiting a common characteristic and emails received by the user's email account specifically; a single user recipient model based on all emails received by the user's email account; and/or multiple user recipient models, each based on a corpus of emails received by the user's email account from senders exhibiting a particular characteristic. The computer system can then selectively implement these recipient models to authenticate an inbound email, as described above.

For example, during a setup period, the computer system can: access a first corpus of emails sent to a user's email account from a first set of senders associated with a first sender characteristic (e.g., within the same domain as the recipient's email account); aggregate a first set of language signals detected in the first corpus of emails into a first recipient model that represents combinations of language signals characteristic of language in bodies of emails sent from the first set of senders (e.g., the recipient's coworkers within the same organization) to the user; and associate the first recipient model with the email account and the first sender characteristic.

Similarly, during the setup period, the computer system can: access a second corpus of emails sent to a user's email account from a second set of senders associated with a second sender characteristic (e.g., outside of the user's same and including email signatures including "engineer" or "developer" terms or listed in the user's digital address book); aggregate a second set of language signals detected in the second corpus of emails into a second recipient model that represents combinations of language signals characteristic of language in bodies of emails sent from the second set of senders (e.g., the recipient's associates outside of the same organization) to the user; and associate the second recipient model with the email account and the second sender characteristic.

The computer system can later: intercept or access a first email inbound to the user's email account; identify a first sender of the first email as associated with the first sender characteristic; select the first recipient model accordingly; and calculate a first similarity score for the first email based on signals detected in the first email and the first recipient model. Similarly, the computer system can later: intercept or access a second email inbound to the user's email account; identify a second sender of the second email as associated with the second sender characteristic; selected the second recipient model accordingly; and calculate a second similarity score for the second email based on signals detected in the second email and the second recipient model.

2. Second Method

Figure 4:
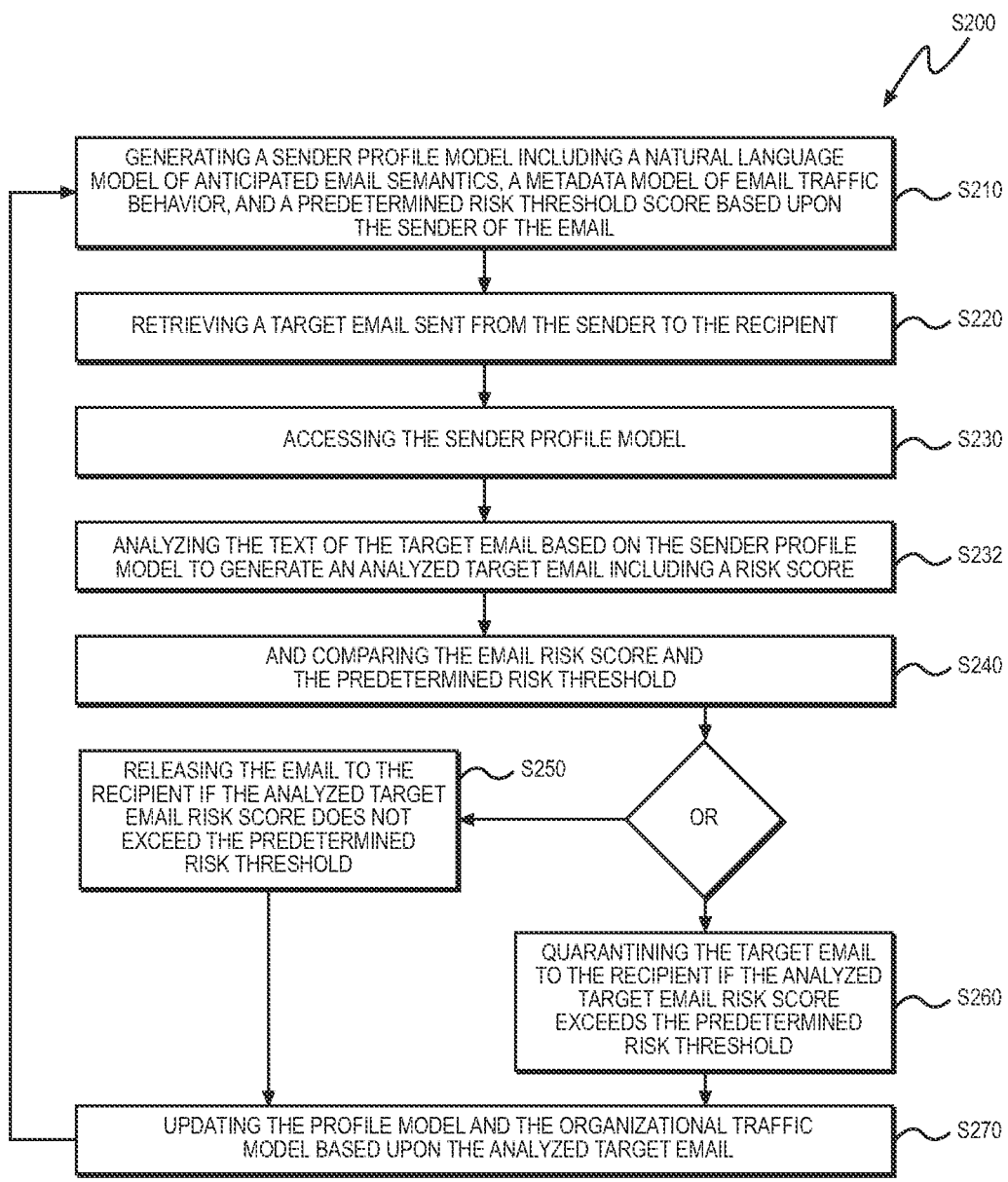
FIG. 4 is a flowchart representation of a second method.

As shown in FIG. 4, a second method S200 to automatically identify and remediate suspicious email traffic includes: generating a sender profile model in Block S210, including a natural language model of anticipated email semantics and a metadata model of email traffic behavior; retrieving a target email sent from the sender to the recipient in Block S220; accessing the sender profile model in Block S230; analyzing the text of the target email based on the sender profile model in Block S232 to generate an analyzed target email including a risk score; and comparing the email risk score and a risk threshold in Block S240.

In one variation of the example implementation, the second method S200 can further include releasing the email to the recipient if the analyzed target email risk score falls below the risk threshold in Block S250; quarantining the target email to the recipient if the analyzed target email risk score exceeds the risk threshold in Block S260; and updating the profile model and the organizational traffic model in Block S270 based upon the target email.

2.1 Applications

Generally, Blocks of the second method S200 can be executed by a computer system (e.g., an incoming mail server, a security server, a computer network, hereinafter "system 100"): to access or intercept an email inbound to an organization (e.g., a computer network or email domain operated by the organization); and to employ a profile model including natural language and semantic indicia relating to the sender (e.g., organization employee) to identify and extract signals indicating a risk or probability that the email is inauthentic (i.e., not drafted and sent by the authentic human owner of the sender email account), that the sender's email address has been compromised or infiltrated, and/or that the sender is being impersonated by a malicious party. In operation, the computer system can execute Blocks of the second method S200 to reduce risk of email impersonation within a hacked email account by characterizing a risk of email impersonation as a function of (e.g., inversely proportional to) similarities between: language structures (e.g., text, tone, intent, urgency language, grammar, semantics) contained in a target email outbound from a sender; and language structures common to verified emails previously sent by the sender and represented in a profile model associated with this sender. Therefore, if the risk associated with the target email exceeds a threshold, the system 100 can execute Blocks of the second method S200 to: automatically quarantine the target email; annotate the target email as possibly malicious or risky for the recipient; and/or notify security personnel to prompt further mitigating action. Conversely, if the risk associated with the email is less than the threshold, the system 100 can: release the email to the recipient; and update the profile model of the user based on language structures extracted from or characterized in the target email.

Therefore, the computer system can execute the second method S200: to develop a profile model for a particular sender based on language structures extracted from verified emails previously sent by the sender; to analyze and interpret a new email from the sender based on the profile model and language structures in this new email to assess a risk or probability that the new email was sent by an impersonator or hacker who gained access to the sender's email account; to automatically quarantine or sequester the new email as a potential impersonation attempt if the new email is characterized by high risk (e.g., contains language structures exhibiting low similarity to the sender profile model); and to automatically alert organization security personnel about the potential impersonation attempt and prompt remediating action (e.g., deletion or release of the email). Furthermore, the system 100 can execute Blocks of the second method S200 to detect potential compromise of the sender's email account or impersonation attempts of the sender based on high-risk emails outbound from the sender's email account (e.g., new emails outbound from the sender's account but containing language structures exhibiting low similarity to the sender profile model). The system 100 can also execute Blocks of the second method S200 to automatically update the profile model for the sender based on language structures extracted from new, verified emails outbound from the sender's email account, thereby refining natural language and other contextual characteristics stored in the sender's profile model and tracking the sender's profile model to changes in the sender's language over time (e.g., as the sender gains experience in a particular position within an organization or moves to different positions within the organization).

For example, the computer system can execute the second method S200 to detect and remediate by quarantine: attempts by a malicious attacker to impersonate an organization member, such as a CEO or CFO, in which the intercepted email contains natural language anomalies in email tone, natural language indicia of malicious intent (e.g., requesting payments, gift cards, cryptocurrency exchanges, etc.); natural language indicia of urgency (e.g., ASAP, EOD, COB, etc.); and natural language trigger words or phrases that are commonly used by impersonators (e.g., asking whether the recipient is currently in the office). The system 100 can execute the second method S200 to evaluate the email based on a prior profile model of the sender, for example the CEO, in which the profile model includes exemplary natural language used by the sender, typical recipients of email from the sender, as well as typical topics, tone, and timelines in emails between the sender and the recipient. The system 100 can execute Blocks of the second method S200 to automatically quarantine any emails that meet risk thresholds, notify appropriate security personnel, take further remediating or mitigating action, and, independent of whether the email is permanently quarantined or released, update the sender's profile model in response to the natural language analysis of the email to better protect against further impersonation attempts.

The second method S200 is described herein as executed by the computer system to detect and handle malicious emails. However, the computer system can additionally or alternatively execute similar methods and techniques to detect and handle impersonation attempts in any text-based messaging medium, including via SMS messages, MMS messages, and/or messages within a workplace communication tool, etc.

2.2 Model Generation

Figure 5:
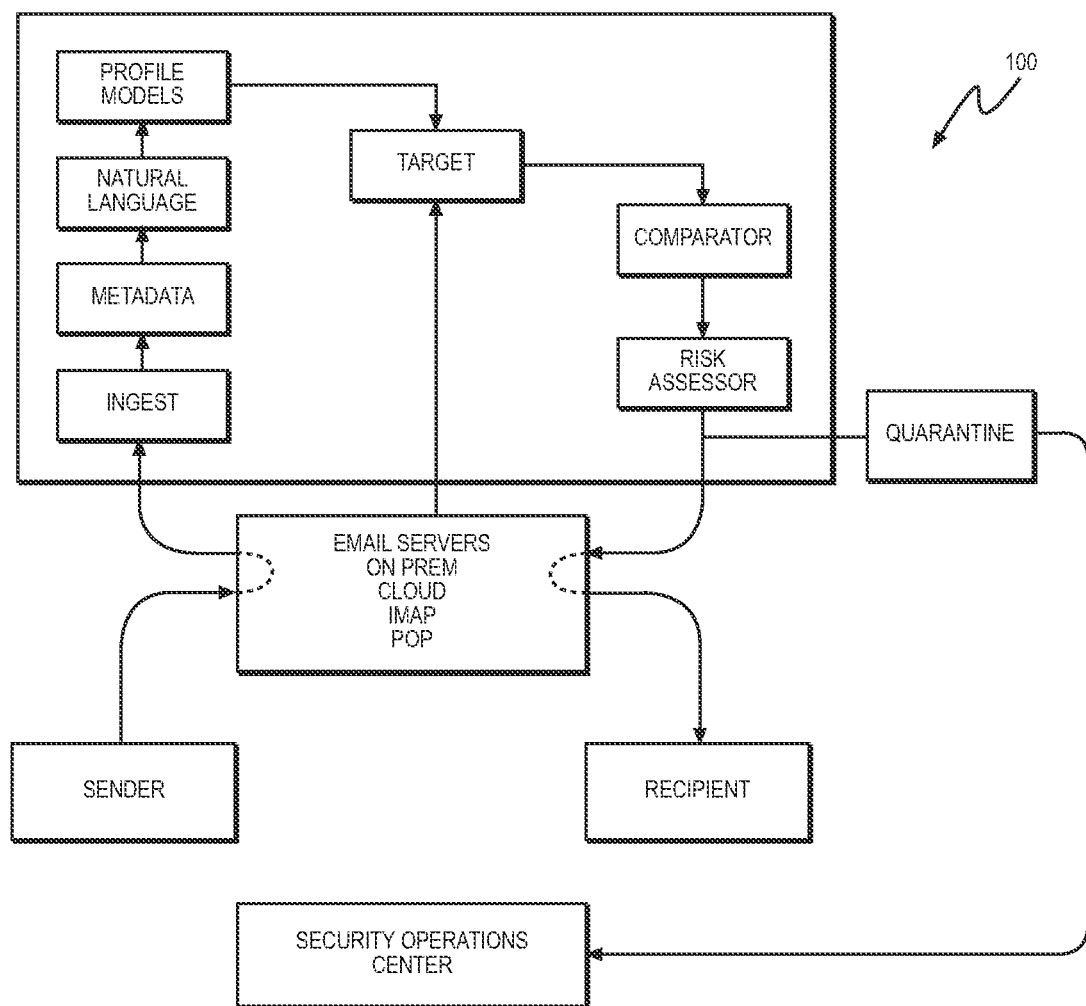
FIG. 5 is a schematic representation of a system.

As shown in the FIG. 5, the system 100 can execute the second method S200 by generating a set of profile models in Block S210. The profile model can include a set of parameters relating to the expected natural language email behavior of an email sender, including natural language behaviors, syntax, grammar, and email content. The profile model can also include a set of metadata or traffic pattern indicia such as typical email recipients, typical times/places/IP addresses associated with emails from the sender's account, and typical domains used by the sender (e.g., work email or personal email). Therefore, a profile model for any single user can include a first portion relating to an expected or baseline natural language behavior (e.g., expected email content and context of the email) as well as a second portion relating to an expected or baseline emailing behavior (e.g., email metadata and traffic patterns relating to that user).

2.2.1 Natural Language Modeling

The system 100 can execute Block S210 by generating a natural language model portion of the profile model. The natural language model can include a natural language baseline model that includes an expected or anticipated content for emails from a selected email sender. For example, an organization's CEO may be a target for email impersonation as employees in the organization are susceptible to execute on the CEO's requests, even if such requests may seem strange or ill advised.

In order to address this risk, the system 100 can generate a natural language model of the profile model by ingesting a representative set of emails previously sent by the CEO to a range of recipients, both inside and outside of the organization. The system 100 can then parse the natural language behaviors, syntax, grammar and email content for each of the ingested emails and then infer a baseline expected email content from the CEO for emails sent to individual recipients, groups of recipients, or classes of recipients.

In general, the profile model can include baseline natural language behaviors for a sender's natural language habits, tone, intent, urgency, and frequently used key words or phrases that may be indicative of an impersonation attempt.

For example, the system 100 can: populate a training data set with subject lines and/or whole email bodies from the selected set of emails previously sent by the sender; and then implement supervised or semi-supervised machine learning techniques to train the sender profile model based on the training data set. In this example, the system 100 can also implement natural language processing and/or natural language understanding techniques to isolate and extract particular language structures from these emails, such as: individual language snippets of different language types (e.g., greetings, financial prompts, calls to action, urgency signals, dates and deadlines, sensitive data); email organization (e.g., bullets and lists, line spacing and line returns, typefaces, word counts); subject line keywords; grammar and language complexity (e.g., quantity of unique words in an email body); errors (e.g., spelling and grammatical errors); language tone; recipient handle and/or domain; etc. The system 100 can also weight these signals, such as: by quantity of available data samples or based on a predefined weighting scheme; or inversely by age of individual data samples. The system 100 can then train a conditional generative adversarial network to output a prediction (or "score") that features of a new email—such as the whole subject and body of the email or set of language structures extracted from the new email—were created by the same sender.

With respect to natural language habits and email tone, the system 100 can generate a profile model based on an ingest of a corpus (e.g., 1,000s or 10,000s) of past emails sent by the CEO. The system 100 can then implement the foregoing methods and techniques to generate a profile model for the CEO that contains exemplary email characteristics and behaviors for the CEO specifically. For example, prior emails may include short, terse, or grammatically incorrect emails to the CFO or COO, e.g., "Dana—please send financials for Q2 immediately." Likewise, external facing emails to board of directors may include more deferential, inquisitive, and aspirational phrases and language, and be much less likely to contain grammatical or semantic abnormalities. Finally, emails to lower ranking managers or employees within the organization may include a different set of phrases and content and may show signs of being heavily edited and devoid of any grammatical and syntax errors. Therefore, the resulting profile model for the CEO can indicate that the CEO uses a particular set of words, phrases, syntax, and tone when emailing with peer C-suite or senior executive members of the organization, but that when emailing middle managers or staff the words, phrases, syntax, and tone exhibit a different natural language profile.

Additionally, the system 100 can further generate a profile model that includes a baseline of intent and urgency for the selected sender based on the same ingested emails. For the organization's CEO, there may be varying indicia of intent and urgency that can be derived from the ingested emails. For example, in email traffic between the CEO and the rest of the C-suite, it may be relatively common to have direct and urgent requests for information or reporting, but less common to have direct and urgent requests for money or gift cards. Similarly, in email traffic between the CEO and the board of directors, it may be much less common to find emails that request information, but more common to find emails that provide information or respond to requests for information with urgency. Finally, in email traffic between the CEO and the rest of the middle management and staff, it may be unlikely to find emails requesting anything of value with any urgency, as it may be more likely that emails between the CEO and lower-level staff are typically broadcast announcements relating to general policies, goals, and objectives of the organization. Therefore, the resulting profile model for the CEO can indicate that the CEO generally emails with requests that evidence intent to gather information or data to certain groups of recipients (e.g., other executives), emails with urgency to provide information or data to other types of recipients (e.g., board of directors), and emails with neither intent nor urgency to other types of recipients (e.g., middle management and staff).

In an alternative of the example implementation, the system 100 can execute Blocks of the second method S200 by generating a profile model that identifies certain trigger words or phrases that the sender uses that might otherwise be mistaken for potentially malicious actions. For example, a malicious actor might impersonate a superior or manager in an organization and send an email to a subordinate with the question, "Are you at your desk?" The malicious intent behind this impersonated email is to try to determine if the recipient is present at her terminal, and if not, that is an indication to the malicious actor that the terminal may be vulnerable and exploitable. However, if the CEO of the company sends a similar email to her executive assistant, then the question and email are both innocuous. Therefore, the profile model can include a baseline of trigger words or phrases that may seem indicative of a threat but for the full context of the sender and the recipient.

2.2.2 Metadata Modeling

In general, the system 100 can execute Blocks of the second method S200 to generate a metadata model for the sender that includes a set of data relating to baseline organizational traffic. The baseline organization traffic can include information relating to the sender's email domain, IP address(es) and locations, typical daily/weekly/monthly email activity, typical recipients, typical recipients' email domains, typical recipients' IP addresses and locations, message size, attachment(s), attachment(s) size, and typical network flow at the sender's email account.

In one example configuration, the system 100 can layer the metadata model on top of the natural language model to provide an additional measure of accuracy and reliability in the profile model for each sender. An example metadata model for an organization's CEO can provide insight into the emailing behavior of the CEO without consideration for the written content of the email traffic. For example, the metadata model can indicate that the CEO typically sends emails during certain times of the day, certain days of the week, to a certain group of recipients (e.g., senior leaders and directors), from a static IP address located at the organization's headquarters. Therefore, if an email allegedly from the CEO is detected and its metadata indicates that it is being sent at 1:47 AM on a Sunday morning, from a different IP address, and to a group of new recipients (e.g., lower-level financial controllers or accounts payable personnel), then the system 100 can employ the metadata model to indicate anomalous behavior.

In another example implementation, the system 100 can execute Block S210 of the second method S200 by generating both a natural language model and a metadata model for an email user or group of users in an organization, (e.g., for high priority personnel or personnel in sensitive positions such as executive leadership, finance, engineering, and human resources). In another example implementation, the system 100 can execute Block S210 of the second method S200 by selectively generating a natural language model or a metadata model for selected users based on those users' respective leadership positions, accesses to sensitive data (including proprietary data, sensitive personal data, sensitive health data), accesses to sensitive financial data, or payment/treasury authority.

In a first variation of the example implementation, the system 100 can execute Block S210 of the second method S200 by generating a natural language model for a user (e.g., a CEO) based on a data set of ingested emails derived from a larger group of users within the organization (e.g., the entire senior leadership of the organization). In this variation, in addition to ingesting the CEO's emails to generate a baseline model for content (e.g., tone, intent, urgency, triggers), the system 100 can ingest an even larger set of emails from a preselected group within the organization. The larger set of ingested emails can provide a group-wise baseline model for how the senior leadership of the organization communicates via email. In another example implementation, the group-derived profile model can be used in the event of a new or recent hire, in which case there may not be sufficient historical email traffic to generate an individual-specific profile model.

In a second variation of the example implementation, the system 100 can execute block S210 of the second method S200 by generating a natural language model for a user (e.g., a CEO) based on a data set of ingested emails derived from a global group of users across a set of organizations (e.g., analogous senior leadership from different organizations all employing the system 100). In this variation, in addition to ingesting the CEO's emails to generate a baseline model for content (e.g., tone, intent, urgency, triggers), the system 100 can ingest an even larger set of emails from a preselected group of peer-type users outside the organization to get cross-organization baseline for CEO email behavior. The larger set of ingested emails can provide a global baseline model for how the senior leadership of various organizations communicate via email. In another example implementation, the global profile model can be used in the event of a new or recent hire, in which case there may not be sufficient historical email traffic to generate an individual-specific profile model. Additionally, organizations may opt to use a global profile model in order to comply with cybersecurity best practices and to normalize their internet security across an industry standard.

2.3 Email Capture

As shown in the FIGURES, the system 100 can execute Blocks of the second method S200 by retrieving a target email sent from the sender to the recipient in Block S220. Generally, in Block S220, the computer system retrieves an email inbound from a sender to a recipient within an email domain, computer network, or organization more generally. For example, the computer system can intercept the email at a SMTP or IMAP server before the email is delivered to the designated recipient. The computer system can also retrieve both emails inbound from outside of the domain or computer network and emails routed inside of the domain or computer network. Generally, the system 100 retrieves a target email by retrieving both the email metadata as well as the email content. In an example implementation, the system 100 can be configured to retrieve all email metadata and email content that traverses the organization, its on-premise email servers, or its cloud-based email servers and accounts.

In one alternate implementation, the system 100 can execute Blocks of the second method S200 by selectively retrieving email content based on email metadata. For example, the system 100 can retrieve email metadata for a first set of emails (e.g., all emails transmitted through an organization) and email content for a second set of emails (e.g., only emails in which a sender, receiver, or other metadata condition is met).

In one variation of the example implementation, the system 100 can retrieve emails for a selected group of senders or recipients, e.g., a group or class of email users within the organization. For example, the system 100 can be configured to retrieve all email content in which the sender or recipient data is correlated to an email user in a key position, for example a user in the finance portion of the organization, the C-level executives, sensitive engineering positions, or other selectable individuals or classes of individuals. In this variation of the example implementation, if an email is sent to or from the finance department, as determined by its headers or other metadata, then the system 100 automatically retrieves the email content for further analysis. Conversely, the system 100 can retrieve email metadata only for email traffic between non-key personnel.

In another variation of the example implementation, the system 100 can retrieve emails for a selected group of senders or recipients based on anomalous email traffic or network patterns. For example, the system 100 can be configured to selectively retrieve all email content for emails transmitted at anomalous times or between anomalous users or groups of users. In this variation of the example implementation, the system 100 can be configured to retrieve email content for emails transmitted to or from any organization users between certain non-business hours or on weekends, both of which can be indicators of a potential breach of the sender's email credentials. Alternatively, the system 100 can be configured to retrieve email content for emails transmitted between anomalous or suspicious sets of senders and recipients (e.g., between the CEO and a lower-level controllers, between the CTO and an engineering technician, etc.).

2.4 Email Analysis

As shown in the FIGURES, the system 100 can execute Blocks of the second method S200 by: accessing a sender profile model in Block S230 and analyzing the text of the target email based on the sender profile model in Block S232. The system 100 can further execute Blocks of the second method S200 to generate an analyzed target email including a risk score that is indicative of whether the email is genuine (e.g., from the sender) and whether the email can be safely delivered to the recipient. As noted above, the profile model can include a set of content cues and context (e.g., metadata) cues from which the system 100 can derive a baseline or typical email sent by the sender to the recipient, including for example an email tone, an email intent, an email urgency, or email trigger phrases.

In general, the system 100 can execute Blocks of the second method S200 in a comprehensive and contextual manner, including an analysis of the email metadata, tone, intent, urgency, and trigger phrases, such that the entire scope of the profile model and the target email are compared and analyzed to determine a level of risk associated with the target email. In turn, a level of risk can be determined by a relative anomalousness of the target email content and metadata to the profile model (e.g., natural language model and metadata model) such that the system 100 can assign a lower risk to relatively compliant and consistent emails. Conversely, the system 100 can assign a higher risk to target emails that deviate or demonstrate substantial anomalies from the profile model.

Generally, the system 100 can execute Block S232 of the second method by comparing the target email tone to a tone aspect of the profile model. As noted above, the profile model for the CEO of an organization can indicate that the CEO uses a particular set of words, phrases, syntax, and tone when emailing with peer C-suite or senior executive members of the organization, but that when emailing middle managers or staff the words, phrases, syntax, and tone take on a different character. Therefore, if the target email is from the CEO to a lower-level employee and reads: "Dear employee, you're work at the company is very valuable. We are undergoing new security training. Please click here and log in to you're account."

The system 100 can compare the target email to the profile model for the CEO to determine that the CEO: normally does not address emails to nondescript individuals such as "employee", normally does not make grammatical errors, normally does not email lower-level employees, and normally does not send emails regarding security protocols or training. Therefore, the system 100 would evaluate this example target email as potentially high risk. Conversely, if the target email was from the CEO to the CFO and reads:

"Pat—need update on Q3 receivables and write downs, cc Jamie in sales."

The system 100 can compare the target email to the profile model for the CEO to determine that the CEO: normally addresses emails to the CFO informally and those emails are typically short, directive, and unsigned. Therefore, the system 100 would evaluate this example target email as lower risk.

Generally, the system 100 can execute Blocks S230 and S232 of the second method S200 by analyzing an intent and urgency of the target email, including for example the presence or absence of intent- and urgency-based semantics or key words. As noted above, a profile model for a CEO can indicate that the CEO generally emails with requests that evidence intent to gather information or data to certain groups of recipients (e.g., other executives), emails with urgency to provide information or data to other types of recipients (e.g., board of directors), and emails with neither intent nor urgency to other types of recipients (e.g., middle management and staff). For example, the CEO profile model can indicate that, in general, requests for information evidencing both intent to gather information and urgency to gather information are generally directed at certain recipients. Likewise, the CEO profile model can indicate that, in general, emails providing information evidencing both intent to provide information and urgency to provide information are generally directed at other recipients. Finally, the CEO profile model can indicate that, in general, emails requesting/providing information with intent or urgency are rarely directed at certain other users, such as for example lower-level managers and staff employees.

In general, the system 100 can execute Blocks S230 and S232 of the second method S200 by ingesting and comparing the intent and urgency of the target email to the sender's profile model. For example, if the CEO allegedly sends an email to a recipient in the organization's finance department with instructions to "immediately transfer cryptocurrency into her individual brokerage account," the system 100 can compare the intent (transfer cryptocurrency into an individual brokerage account) and the urgency (immediate) with the profile model of the CEO. Based on the urgency and intent of this example email, the system 100 can execute Blocks of the second method S200 to determine that this email has a relatively high risk of being disingenuous and therefore label it as high risk.

Generally, the system 100 can execute Blocks S230 and S232 of the second method S200 by analyzing or identifying one or more trigger phrases in the target email, including for example key words or phrases used in social engineering attacks by malicious actors. For example, an anonymous member (e.g., with a new or unknown email address) of the organization's information technology (IT) department might send an email to the CFO with instructions to "call a number for assistance in resetting" certain permissions, passwords, or authentications. The system 100 can execute Blocks of the second method S200 to identify that the written request to call for assistance, targeted at an individual with access to the organization's finances, is a possible or probable social engineering attack and therefore label it as high risk. Conversely, if the email is from Susan in IT, and she frequently emails with the CFO on IT-related issues, then the system 100 can execute Blocks of the second method S200 to identify that a normally triggering request to call Susan, a known and trusted sender, is in fact a genuine request with minimal risk.

Generally, the system 100 can execute Blocks of the second method S200 by analyzing both the content of the email (tone, intent, urgency, triggers) as well as its associated metadata. As noted above, an example metadata model for an organization's CEO can provide insight into the emailing behavior of individuals within the organization without consideration for the written content of the email traffic. For example, the metadata model can indicate that the CEO typically sends emails during certain times of the day, certain days of the week, to a certain group of recipients (e.g., senior leaders and directors), from a static IP address located at the organization's headquarters. Likewise, the metadata model for a sales associate in an international organization might indicate that she sends emails at all hours of the day (measured by local headquarters time) from varying IP addresses and addressed to a large group of individuals across sales, finance, engineering, and logistics. In executing Blocks of the second method S200, the system 100 can assess a risk associated with the target email based on a compliance or deviation from the metadata model associated with the sender. As indicated above, each individual sender may have a unique metadata model depending upon her email habits, travel habits, and job function.

2.5 Risk Assessment

As shown in the FIGURES, the system 100 can execute Blocks of the second method S200 by generating a risk threshold based on the profile model of the sender in Block S240. In general, a risk threshold of a sender can be proportional to that individual's area of responsibilities and authorities within the organization, such that an individual with access to sensitive information or financial authority will generally have a lower risk threshold, (e.g., higher standard of scrutiny). Conversely, an individual with little responsibility or authority will generally define a higher risk threshold, (e.g., lower standard of scrutiny).

In one variation of the example implementation, the system 100 can execute Blocks of the second method S200 by associating new users, for whom there is insufficient individual data for a profile model, with a group or global class of user based on the new user's position within the organization. For example, both a new CFO and a new shipping clerk will lack the email history for an individual profile model and associated risk tolerance. However, the system 100 can execute Blocks of the second method S200 to assign a CFO-type risk threshold to the new CFO (e.g., low risk threshold) and a shipping clerk-type risk threshold to the new shipping clerk (e.g., high risk threshold). Accordingly, for new employees, the system 100 can measure relative compliance or anomalousness with a baseline profile model that is derived from either larger groups or global classes of employees for which there are content and metadata norms.

As shown in the FIGURES, the system 100 can execute Blocks of the second method S200 by comparing the target email risk score and the risk threshold in Block S242. As noted above, the system 100 can execute Blocks of the second method S200 to retrieve and analyze a target email and assign a risk score to the target email based on a comparison of the target email and the profile model of the sender. The system 100 can then compare the risk score of the target email to the risk threshold determined in Block 140 to assess the comparative risk of the target email.

In one variation of the example implementation, the system 100 can further execute the Blocks of the second method S200 by weighting the target email risk score and sender risk threshold comparison by tone, intent, urgency, triggers, and metadata in Block S244. As noted above, the system 100 can implement both of the target email risk score and the sender risk threshold in a contextual manner depending upon the status, access, tenure, and responsibility of the email sender. In this example variation, the system 100 can execute Blocks of the second method by weighting a set of email content or metadata measures such that some aspects (e.g., intent, urgency) are more heavily weighted in assessing target email risk.

In one alternative, the relative weighing of the tone, intent, urgency, triggers and metadata can be varied or tuned to address internal or external factors. For example, in organizations anticipating a significant financial milestone, the system 100 can be configured to preferentially weight email content characteristics of intent and urgency to protect against any potential leaks of sensitive information or exploitation of eager employees.

Conversely, for an organization that has a history of trade secret loss, the system 100 can be configured to more heavily weight email content characteristics relating to engineering, product deployment, and product development. Similarly, in this example implementation the system 100 can be configured to more heavily weight metadata measures such as: sender/recipient identification and access to trade secret information, external recipients with competitor's domain names, new IP addresses not associated with the organization, email transmission at odd hours or on weekends, and the presence and size of attachments, all of which might be indicators of potential loss of proprietary information.

Generally, the system 100 and method S200 can be tuned and adapted to accommodate both internal and external occurrences. For example, aspects of the system 100 can be configured and customized to generate profile models for both old and new employees as well as employees who change positions within the organization and therefore are expected to have new patterns of email behavior. Similarly, the system 100 can be tuned and configured to address potential high consequence events such as product launches, stock offerings, acquisitions, or other legal proceedings by adjusting measures and weighting of risk profiles and risk tolerance.

2.6 Email Handling

As shown in the FIGURES, the system 100 can execute Blocks of the second method S200 by either: releasing the email to the sender if the analyzed target email risk score falls below the risk threshold in Block S250 or quarantining the target email to the sender if the analyzed target email risk score exceeds the risk threshold in Block S260.

In one implementation of Block S260, the system 100 can automatically generate a message and transmit the message to the putative sender, at her organizational domain address, that the target email has been quarantined for security reasons. Alternatively, the system 100 can execute Block S260 by automatically generating and transmitting the message to the putative sender, at a secondary account associated with the sender and known at the organization, that the target email has been quarantined for security reasons. Upon receipt of the alert message at her organizational email or secondary account, the sender may determine that either her email account has been compromised or that her attempted email was sufficiently risky that the system 100 regarded her email account as being compromised.

In an alternative implementation, the system 100 can execute Block S260 by generating and transmitting an alert message to the intended recipient that an email intended for her has been quarantined for security reasons. In this alternative, the alert message can be sent by the system 100 to an account associated with the organizational domain, for example to a security operations center email account configured for such alerts.

In another alternative implementation, the system 100 can execute Block S260 by generating and transmitting an alert message to a security operations center or security operations center personnel. In this alternative, the alert message can be displayed in a security operations center portal or monitoring application and/or transmitted to an email account associated with the security operations center and/or transmitted to an email account associated with an individual security personnel.

In another alternative implementation, the system 100 can further execute Blocks of the second method S200 by releasing the target email to the recipient if an approval message is received from a combination of the putative sender, the intended recipient, or the security operations center. For example, if each of the putative sender, the intended recipient, and the security operations center personnel agree that the target email is in fact a threat, they can request that the security operations center personnel override the target email quarantine and release the message to the recipient. Generally, a request to override the quarantine process can be received by the system 100 via an email reply or email forward of the alert message to the security operations center, at which security operations center personnel can consent to interfacing with the system 100 to override the quarantine and release the target email. In another alternative embodiment, a majority of the sender, recipient, and security operations center personnel can request to override the quarantine process, through which the security operations center personnel can interface with the system 100 to permit release of the target email.

2.7 Variation: Sender Profile Models (Recipient)

In one variation of the example implementation, the system 100 can execute Blocks of the second method S200 to generate a sender profile model based in part upon a recipient or recipients (determined according to metadata retrieved through the corpus of emails). In this variation, the system 100 can label sets within the corpus of emails by recipient characteristics including: in/out of organization, vendor/client, sister or parent organization, or friend, family member (e.g., personal email content). Generally, the system 100 can label sets within the corpus based upon email domain identifiers. The system 100 can further execute Blocks of the second method S200 to: segment the email corpus into two or more groups based on these recipient characteristics; and implement the natural language and metadata methods and techniques described above to construct one sender profile model for each of these email groups.

During operation, the system 100 can further execute Blocks of the second method S200 by: retrieving an email from the sender, extracting recipient characteristics, matching the recipient characteristics to a recipient group within the sender profile model, extracting language structures from email, implementing the particular sender profile model to characterize a risk of the email based on the extracted language structures, and then selectively elective releasing or quarantining the email based upon characterized risk.

Therefore, in this variation of the example implementation, the system 100 and method S200 can be configured to respond to different language characteristics within a sender email based in part upon the identity and characteristics of the recipient.

2.8 Variation: Group Profile Models

In another variation of the example implementation, the system 100 can execute Blocks of the second method S200 to generate a sender profile model based in part upon a group identifier or characteristic (e.g., at the organization level, groups within the organization, functions within the organization, etc.) In this variation of the example implementation, the system 100 can retrieve a corpus of emails for a group of senders sharing a particular group affiliation or characteristic, for example the entire C-suite, all of marketing, all of finance, all of the interns, all of the senders who work with a particular vendor or customer etc. The system 100 can then implement methods and techniques described above to construct a group profile model based on language structures extracted from past verified emails sent by senders within this group.

During operation, the system 100 can then execute Blocks of the second method S200 to: retrieve an email from the sender, extract sender characteristics from the metadata, match the sender to a particular group sender profile model, extract language structures from the email, implement the particular group sender profile model to characterize a risk of the email based upon the extracted language structures, and selectively release or quarantine the email based upon the characterized risk.

Therefore, in this variation of the example implementation, the system 100 and method S200 can be configured to perform and execute risk assessment for email communications from senders for whom a corpuses of past emails of sufficient size to create sender-specific profile models are not available (e.g., new employees, new subsidiaries) and senders who have moved to different positions within the organization and who may therefore adopt a differing language model suited to their new position (e.g., promotion from intern to staff or staff to management). As the new or repositioned members of the organization build a new corpus of emails, the system 100 can implement the techniques and methods described here to generate individualized sender-specific profile models.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
obtaining, at an email computer system, a sender model that represents first language included in previously sent emails associated with an email account;
accessing an outbound email sent from the email account and destined for a recipient;
analyzing second language of the outbound email with respect to a set of language concepts;
determining, based on the analyzing, that the second language includes a first word that is of a financial concept;
determining, based on the analyzing, that the second language includes a second word that is of an action concept associated with an action to take with respect to the first word;
based at least in part on the second language including the first word of the financial concept and the second word of the action concept, calculating a similarity score between the outbound email and at least one of the previously sent emails represented in the sender model;
identifying a characteristic of a user of the email account; and
obtaining a group sender model that represents third language included in second previously sent emails associated with a group of users exhibiting the characteristic;
determining that the outbound email is a malicious email based at least in part on the similarity score and at least partly using the group sender model; and
performing a remedial action with respect to the outbound email the remedial action comprising at least one of:
deleting the outbound email;
quarantining the outbound email; or
updating the sender model at least partly using the outbound email.

2. The method of claim 1, further comprising:
determining, based on the analyzing, that the second language includes a third word that is of an urgency concept associated with the action to take with respect to the first word,
wherein determining that the outbound email is a malicious email is further based at least in part on the third word that is of the urgency concept.

3. The method of claim 1, further comprising:
determining, based on the analyzing, that the second language includes a third word that is of a deadline concept associated with a time at which the action is to be taken with respect to the first word, wherein determining that the outbound email is a malicious email is further based at least in part on the third word that is of the deadline concept.

4. The method of claim 1, wherein analyzing second language of the outbound email with respect to the set of language concepts includes: obtaining a natural language processing model trained on a financial services and financial transaction lexicon; using the natural language processing model, identifying first word as being included in a sequence of words, related to financial transactions, in the outbound email; correlating the sequence of words to a financial transaction language concept; and utilizing the financial transaction language concept to identify the at least one of the previously sent emails represented in the sender model.

5. The method of claim 1, further comprising:
determining that the email account is related to the group of email accounts;
associating the second sender model with the email account;
accessing a second outbound email sent from the email account;
analyzing third language of the second outbound email with respect to the set of language concepts;
determining, based on the analyzing, that the third language includes a third word that is of a second financial concept;
calculating a second similarity score between the second outbound email and at least one of the second previously sent emails represented in the group sender model; and
performing a second remedial action with respect to the second outbound email based at least in part on the second similarity score.

6. The method of claim 1, wherein identifying the characteristic of the user of the email account includes identifying a department, within an organization, employing the user, further comprising:
accessing the second previously sent emails from the group of users associated with the department within the organization; and
generating the group sender model using the second previously sent emails.

7. A computer-email system comprising:
one or more processors; and
one or more non-transitory computer-readable media storing computer-executable instructions that, when executed by the one or more processors, cause the one or more processors to perform operations comprising:
obtaining a sender model that represents first language included in previously sent emails associated with an email account;
accessing an outbound email sent from the email account and destined for a recipient;
analyzing second language of the outbound email with respect to a set of language concepts;
determining, based on the analyzing, that the second language includes a first word that is of a financial concept;
determining, based on the analyzing, that the second language includes a second word that is of an action concept associated with an action to take with respect to the first word;
based at least in part on the second language including the first word of the financial concept and the second word of the action concept, calculating a similarity score between the outbound email and at least one of the previously sent emails represented in the sender model;
identifying a characteristic of a user of the email account; and
obtaining a group sender model that represents third language included in second previously sent emails associated with a group of users exhibiting the characteristic;
determining that the outbound email is a malicious email based at least in part on the similarity score and at least partly using the group sender model; and
performing a remedial action with respect to the outbound email the remedial action comprising at least one of:
deleting the outbound email;
quarantining the outbound email; or
updating the sender model at least partly using the outbound email.

8. The computer-email system of claim 7, the operations further comprising:
determining, based on the analyzing, that the second language includes a third word that is of an urgency concept associated with the action to take with respect to the first word,
wherein determining that the outbound email is a malicious email is further based at least in part on the third word that is of the urgency concept.

9. The computer-email system of claim 7, the operations further comprising:
determining, based on the analyzing, that the second language includes a third word that is of a deadline concept associated with a time at which the action is to be taken with respect to the first word,
wherein determining that the outbound email is a malicious email is further based at least in part on the third word that is of the deadline concept.

10. The computer-email system of claim 7, the operations wherein analyzing second language of the outbound email with respect to the set of language concepts includes: obtaining a natural language processing model trained on a financial services and financial transaction lexicon; using the natural language processing model, identifying first word as being included in a sequence of words, related to financial transactions, in the outbound email; correlating the sequence of words to a financial transaction language concept; and utilizing the financial transaction language concept to identify the at least one of the previously sent emails represented in the sender model.

11. The computer-email system of claim 7, the operations further comprising:
determining that the email account is related to the group of email accounts;
associating the second sender model with the email account;
accessing a second outbound email sent from the email account;
analyzing third language of the second outbound email with respect to the set of language concepts;
determining, based on the analyzing, that the third language includes a third word that is of a second financial concept;
calculating a second similarity score between the second outbound email and at least one of the second previously sent emails represented in the group sender model; and performing a second remedial action with respect to the second outbound email based at least in part on the second similarity score.

12. The computer-email system of claim 7, wherein identifying the characteristic of the user of the email account includes identifying a department, within an organization, employing the user, the operations further comprising:
  accessing the second previously sent emails from the group of users associated with the department within the organization; and
  generating the group sender model using the second previously sent emails.

13. One or more non-transitory computer-readable storage media storing computer-executable instructions that, when executed by one or more processors, cause a network orchestrator to perform operations comprising:
  obtaining, at an email computer system, a sender model that represents first language included in previously sent emails associated with an email account;
  accessing an outbound email sent from the email account and destined for a recipient;
  analyzing second language of the outbound email with respect to a set of language concepts;
  determining, based on the analyzing, that the second language includes a first word that is of a financial concept;
  determining, based on the analyzing, that the second language includes a second word that is of an action concept associated with an action to take with respect to the first word;
  based at least in part on the second language including the first word of the financial concept and the second word of the action concept, calculating a similarity score between the outbound email and at least one of the previously sent emails represented in the sender model;
  identifying a characteristic of a user of the email account; and
  obtaining a group sender model that represents third language included in second previously sent emails associated with a group of users exhibiting the characteristic;
  determining that the outbound email is a malicious email based at least in part on the similarity score and at least partly using the group sender model; and
  performing a remedial action with respect to the outbound email the remedial action comprising at least one of:
    deleting the outbound email;
    quarantining the outbound email; or
    updating the sender model at least partly using the outbound email.

14. The one or more non-transitory computer-readable media of claim 13, the operations further comprising:
  determining, based on the analyzing, that the second language includes a third word that is of an urgency concept associated with the action to take with respect to the first word,
  wherein determining that the outbound email is a malicious email is further based at least in part on the third word that is of the urgency concept.

15. The one or more non-transitory computer-readable media of claim 13, the operations further comprising:
  determining, based on the analyzing, that the second language includes a third word that is of a deadline concept associated with a time at which the action is to be taken with respect to the first word,
  wherein determining that the outbound email is a malicious email is further based at least in part on the third word that is of the deadline concept.

16. The one or more non-transitory computer-readable media of claim 13, wherein analyzing second language of the outbound email with respect to the set of language concepts includes: obtaining a natural language processing model trained on a financial services and financial transaction lexicon; using the natural language processing model, identifying first word as being included in a sequence of words, related to financial transactions, in the outbound email; correlating the sequence of words to a financial transaction language concept; and utilizing the financial transaction language concept to identify the at least one of the previously sent emails represented in the sender model.

17. The one or more non-transitory computer-readable media of claim 13, the operations further comprising:
  determining that the email account is related to the group of email accounts;
  associating the second sender model with the email account;
  accessing a second outbound email sent from the email account;
  analyzing third language of the second outbound email with respect to the set of language concepts;
  determining, based on the analyzing, that the third language includes a third word that is of a second financial concept;
  calculating a second similarity score between the second outbound email and at least one of the second previously sent emails represented in the group sender model; and
  performing a second remedial action with respect to the second outbound email based at least in part on the second similarity score.

* * * * *